US012046098B2

(12) United States Patent
Yoshida et al.

(10) Patent No.: US 12,046,098 B2
(45) Date of Patent: Jul. 23, 2024

(54) PAPER SHEET PROCESSING DEVICE

(71) Applicant: LAUREL PRECISION MACHINES CO., LTD., Osaka (JP)

(72) Inventors: Shinpei Yoshida, Tokyo (JP); Motonori Shinagawa, Saitama (JP); Motoki Shimono, Tokyo (JP); Yuji Sugiyama, Tokyo (JP)

(73) Assignee: LAUREL PRECISION MACHINES CO., LTD., Osaka (JP)

( * ) Notice: Subject to any disclaimer, the term of this patent is extended or adjusted under 35 U.S.C. 154(b) by 1022 days.

(21) Appl. No.: 16/961,707

(22) PCT Filed: Jan. 21, 2019

(86) PCT No.: PCT/JP2019/001629
§ 371 (c)(1),
(2) Date: Jul. 13, 2020

(87) PCT Pub. No.: WO2019/146540
PCT Pub. Date: Aug. 1, 2019

(65) Prior Publication Data

US 2021/0366221 A1 Nov. 25, 2021

(30) Foreign Application Priority Data

Jan. 26, 2018 (JP) ................................ 2018-011782

(51) Int. Cl.
*G07D 11/25* (2019.01)
*G07D 7/00* (2016.01)
(Continued)

(52) U.S. Cl.
CPC ............... *G07D 11/13* (2019.01); *G07D 7/00* (2013.01); *G07D 11/14* (2019.01); *G07D 11/20* (2019.01);
(Continued)

(58) Field of Classification Search
CPC ........ G07D 11/13; G07D 11/14; G07D 11/25; G07D 7/00; G07D 2207/00;
(Continued)

(56) References Cited

U.S. PATENT DOCUMENTS 6,981,637 B2 * 1/2006 Nagayoshi .............. G07F 19/20 235/379
2004/0217536 A1 11/2004 Isobe et al.

FOREIGN PATENT DOCUMENTS

CN 1504967 A 6/2004
CN 1508056 A 6/2004
(Continued)

OTHER PUBLICATIONS

Chinese Office Action mailed Mar. 14, 2022 in Chinese Application No. 201980009195.7, with English translation, 19 pages.
(Continued)

*Primary Examiner* — Luis A Gonzalez
(74) *Attorney, Agent, or Firm* — Nixon & Vanderhye P.C.

(57) ABSTRACT

A paper sheet processing device includes: an input unit into which paper sheets are input from the outside; an identification unit for identifying the paper sheets fed out from the input unit while allowing them to pass through in a first direction and identifying the paper sheets while allowing them to pass through in a second direction opposite to the first direction; a temporary storage unit for temporarily storing the paper sheets identified as being acceptable by the identification unit; a payout unit for accommodating the paper sheets identified as being unacceptable by the identification unit so as to be able to be taken out to the outside; and a storage unit for storing the paper sheets fed out from the temporary storage unit and identified by the identification unit while being allowed to pass through the identification unit in the second direction, wherein the paper sheets fed out from the temporary storage unit and identified by the
(Continued)

identification unit while being allowed to pass through the identification unit in the second direction can be transferred to the input unit.

5 Claims, 9 Drawing Sheets

(51) Int. Cl.

| | |
|---|---|
| ***G07D 11/13*** | (2019.01) |
| ***G07D 11/14*** | (2019.01) |
| ***G07D 11/20*** | (2019.01) |
| ***G07D 11/30*** | (2019.01) |
| *G07D 11/237* | (2019.01) |
| *G07D 11/60* | (2019.01) |

(52) U.S. Cl.
CPC ........... *G07D 11/30* (2019.01); *G07D 11/237* (2019.01); *G07D 11/60* (2019.01); *G07D 2207/00* (2013.01); *G07D 2211/00* (2013.01)

(58) Field of Classification Search
CPC .... G07D 2211/00; G07D 11/20; G07D 11/24; G07D 11/30; B65H 31/18
See application file for complete search history.

(56) References Cited

FOREIGN PATENT DOCUMENTS

| | | | | | |
|---|---|---|---|---|---|
| CN | 101290690 | A | | 10/2008 | |
| CN | 101533542 | A | | 9/2009 | |
| CN | 101027698 | | | 5/2010 | |
| CN | 101727698 | A | | 6/2010 | |
| CN | 102622806 | A | | 8/2012 | |
| CN | 102934147 | A | | 2/2013 | |
| CN | 103996240 | A | | 8/2014 | |
| CN | 203909909 | U | | 10/2014 | |
| CN | 104867228 | A | | 8/2015 | |
| CN | 105224975 | | | 1/2016 | |
| CN | 207148954 | | | 3/2018 | |
| EP | 2782076 | A1 | | 9/2014 | |
| EP | 3206193 | A1 | | 8/2017 | |
| JP | 61291369 | A | * | 12/1986 | |
| JP | 10-011631 | A | | 1/1998 | |
| JP | 2002-002981 | A | | 1/2002 | |
| JP | 2003-051046 | | | 2/2003 | |
| JP | 2005-096896 | | | 4/2005 | |
| JP | 2011-060198 | A | | 3/2011 | |
| JP | 2012046275 | A | * | 3/2012 | |
| JP | 2013-050782 | A | | 3/2013 | |
| JP | 2015-041133 | | | 3/2015 | |
| JP | 2015-125712 | A | | 7/2015 | |
| JP | 2017-027198 | | | 2/2017 | |
| WO | WO 2013/150860 | A1 | | 10/2013 | |
| WO | WO-2016056464 | A1 | * | 4/2016 | ............. G07D 11/22 |
| WO | 03/032263 | | | 4/2017 | |

OTHER PUBLICATIONS

International Search Report for PCT/JP2019/001629, mailed Apr. 2, 2019, 3 pages.
Written Opinion of the ISA for PCT/JP2019/001629, mailed Apr. 2, 2019, 4 pages.
Search Report with English translation for TW108102506, dated Oct. 4, 2019, 7 pages.
Office Action mailed Jul. 23, 2021 in Chinese Application No. 201980009195.7 with partial English translation (Search Report), 10 pages.
Notice of Reasons for Rejection mailed Jun. 1, 2021 in Japanese Application No. 2018-011782, with English translation, 7 pages.
Extended European Search Report Mailed Oct. 1, 2021 in European Application No. 19743458.2, 11 pages.

* cited by examiner

PAPER SHEET PROCESSING DEVICE

TECHNICAL FIELD

The present invention relates to a paper sheet processing device.

This application is the U.S. national phase of International Application No. PCT/JP2019/001629 filed Jan. 21, 2019, which designated the U.S. and claims priority to Japanese Patent Application No. 2018-11782, filed Jan. 26, 2018, the entire contents of each of which are hereby incorporated reference.

BACKGROUND ART

A bill processing device, which is a type of paper sheet processing device, takes in bills set in a depositing unit into the device, temporarily holds bills identified by an identification unit in a temporary holding unit, and transfers the bills from the temporary holding unit to a storage unit or the like for storage after various processes are completed. Furthermore, the bill processing device feeds out the bills stored in the storage unit, transfers them to a dispensing unit, and collects them so that they can be taken out of the machine. In such a bill processing device, the bill processing device described in Patent Document 1 has a dedicated depositing unit and dispensing unit, respectively. In other words, an input port for taking in the bills into the bill processing device and a payout port for ejecting the bills to the outside of the bill processing device are specifically arranged at different positions. This is because the bills are transferred in different directions, and the transfer paths for deposit and withdrawal have an optimal layout.

PRIOR ART DOCUMENTS

Patent Document

[Patent Document 1] Japanese Unexamined Patent Application, First Publication No. 2017-27198

SUMMARY OF THE INVENTION

Problems to be Solved by the Invention

In the above-described paper sheet processing device, it is possible to perform the paper sheets transferred to the outlet of the paper sheet processing device may be subjected to a re-identification process, self-examination process, or the like based on the identification result at the identification unit. In such cases, an operation was necessary for the operator to take out the paper sheets transferred to the payout port and transfer them to the input port again in order to take in the ejected paper sheets into the paper sheet processing device again. Therefore, an operation by an operator was required for the re-identification process, self-examination process, or the like of the paper sheets, and these processes took a lot of time, which was a disadvantage.

Therefore, an object of the present invention is to provide a paper sheet processing device capable of shortening the processing time of re-identification process, self-examination process, or the like of the paper sheets.

Means for Solving the Problems

In order to achieve the above object, the paper sheet processing device according to a first aspect of the present invention includes: an input unit in which paper sheets are input from the outside and the input paper sheets are fed out to the inside; an identification unit for identifying the paper sheets fed out from the aforementioned input unit while allowing them to pass through in a first direction; a temporary storage unit for temporarily storing the paper sheets fed out from the aforementioned input unit and identified as being acceptable by being allowed to pass through in the aforementioned first direction in the aforementioned identification unit and for feeding out the aforementioned temporarily stored paper sheets; a payout unit for accommodating the paper sheets fed out from the aforementioned input unit and identified as being unacceptable by the aforementioned identification unit so as to be able to be taken out to the outside; and a storage unit for storing the paper sheets fed out from the aforementioned temporary storage unit and identified by being allowed to pass through in the aforementioned second direction in the aforementioned identification unit, and transfers the paper sheets fed out from the aforementioned temporary storage unit and identified by being allowed to pass through in the aforementioned second direction in the aforementioned identification unit to the aforementioned input unit.

According to the first aspect described above, the paper sheets input from the outside of the device are fed out from the input unit into the device, and are identified by the identification unit while being allowed to pass through in the first direction, and the paper sheets identified as being acceptable are temporarily stored in the temporary storage unit. On the other hand, the paper sheets identified as being unacceptable are transferred to the payout unit which can be taken out of the device. Then, the paper sheets temporarily stored in the temporary storage unit are identified while passing through the identification unit in the second direction, and are stored in the storage unit based on the result. On the other hand, the paper sheets temporarily stored in the temporary storage unit can be transferred to the input unit after being identified by the identification unit while passing through in the second direction. Accordingly, for example, when the paper sheets are identified while being transferred in both the first direction and the second direction of the identification unit, the paper sheets can be transferred back and forth through a route connecting the input unit, the identification unit, and the temporary storage unit. Therefore, it becomes possible to shorten the processing time. Further, for example, when the paper sheets temporarily stored in the temporary storage unit are identified in the identification unit while being passed through in the second direction and stored in the storage unit based on the result, the paper sheets identified as being abnormal in the identification unit can be transferred to the input unit, then fed out from the input unit and transferred to the temporary storage unit, then fed out from the temporary storage unit and re-identified while being allowed to pass through in the reverse direction in the identification unit, and stored in the storage unit based on the result. Accordingly, it is possible to eliminate the manual input operation into the input unit for re-identification of the paper sheet identified as being abnormal by the identification unit. Therefore, the processing time can be shortened and the labor can be suppressed.

A paper sheet processing device according to a second aspect of the present invention is such that, in the first aspect, at the time of an identification adjustment process in which paper sheets for identification adjustment are identified by the aforementioned identification unit while being allowed to pass through in the aforementioned first direction in the aforementioned identification unit, and are also identified by the aforementioned identification unit while being allowed to pass through in the aforementioned second direction, the paper sheets for identification adjustment input into the aforementioned input unit and fed out from the aforementioned input unit are identified by the aforementioned identification unit while being allowed to pass through in the aforementioned first direction in the aforementioned identification unit, and then transferred to the aforementioned temporary storage unit, and the paper sheets for identification adjustment are fed out from the aforementioned temporary storage unit and identified by the aforementioned identification unit while being allowed to pass through in the aforementioned second direction in the aforementioned identification unit, and then returned to the aforementioned input unit.

According to the second aspect described above, at the time of identification adjustment process in which paper sheets for identification adjustment are identified by the identification unit while being allowed to pass through in the first direction in the identification unit, and are also identified by the identification unit while being allowed to pass through in the second direction, the paper sheets for identification adjustment input into the input unit and fed out from the input unit are identified by the identification unit while being allowed to pass through in the first direction in the identification unit, and then transferred to the temporary storage unit, and the paper sheets for identification adjustment are fed out from the temporary storage unit and identified by the identification unit while being allowed to pass through in the second direction in the identification unit, and then returned to the input unit. Accordingly, the paper sheets for identification adjustment can be transferred back and forth through a route connecting the input unit, the identification unit, and the temporary storage unit. Therefore, the processing time for the identification adjustment process can be shortened.

A paper sheet processing device according to a third aspect of the present invention is such that, in the first aspect, at the time of a self-examination process in which paper sheets stored in the aforementioned storage unit are fed out from the aforementioned storage unit and temporarily stored in the aforementioned temporary storage unit, and then the paper sheets stored in the aforementioned temporary storage unit are fed out from the aforementioned temporary storage unit and identified by the aforementioned identification unit while being allowed to pass through the aforementioned identification unit in the aforementioned second direction, and then stored in the storage unit, the paper sheets fed out from the aforementioned temporary storage unit and identified as being abnormal by the aforementioned identification unit while being allowed to pass through the aforementioned identification unit in the aforementioned second direction are transferred to the aforementioned input unit, then fed out from the aforementioned input unit and returned to the aforementioned temporary storage unit, and fed out from the aforementioned temporary storage unit and identified by the aforementioned identification unit while being allowed to pass through in the aforementioned second direction in the aforementioned identification unit.

According to the third aspect described above, at the time of self-examination process in which paper sheets in the storage unit are fed out from the storage unit and temporarily stored in the temporary storage unit, and then the paper sheets in the temporary storage unit are fed out from the temporary storage unit and identified by the aforementioned identification unit while being allowed to pass through in the second direction in the identification unit, and then stored in the storage unit, the paper sheets fed out from the temporary storage unit and identified as being abnormal by the aforementioned identification unit when being allowed to pass through the identification unit in the second direction can be transferred to the input unit, then fed out from the input unit and transferred to the temporary storage unit, then fed out from the temporary storage unit and re-identified while being passed through in the second direction in the identification unit, and stored in the storage unit based on the result. Accordingly, it is possible to eliminate the manual input work into the input unit for re-identification of the paper sheet identified as being abnormal by the identification unit. Therefore, the processing time for the self-examination process can be shortened, and the labor can be suppressed.

Advantageous Effects of the Invention

According to the present invention, it is possible to provide a paper sheet processing device capable of shortening the processing time.

EMBODIMENTS FOR CARRYING OUT THE INVENTION

A paper sheet processing device according to an embodiment of the present invention will be described below with reference to the drawings. A paper sheet processing device 10 according to the present embodiment processes bills as paper sheets. Needless to say, the paper sheet processing device 10 may process paper sheets other than bills. The paper sheet processing device 10 is a bill depositing and dispensing device capable of a deposit processing for internally storing a bill input from the outside and a dispensing process for dispensing an internally stored bill so as to be able to be taken out to the outside. It should be noted that in the following description, the term "front" indicates the operator side, and the term "rear" indicates the side opposite to the operator.

Figure 1:
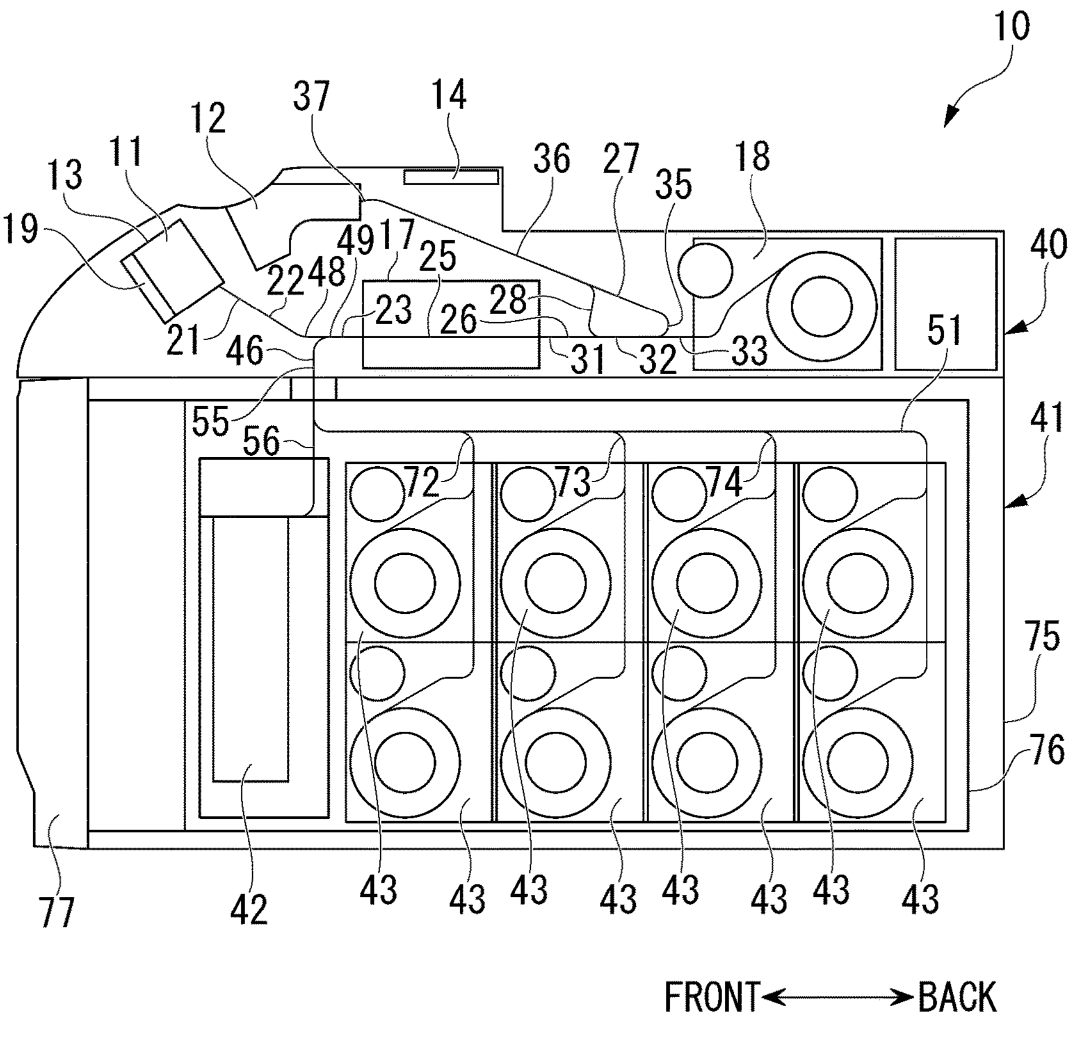
FIG. 1 is a side view schematically showing a paper sheet processing device according to an embodiment of the present invention.

As shown in FIG. 1, in an upper portion on the front surface side of the paper sheet processing device 10, there is provided an input unit 11 into which bills for deposit are input from outside the device. A payout unit 12 is provided behind the input unit 11 of the paper sheet processing device 10. The payout unit 12 feeds out deposit-rejected bills among bills for deposit that cannot be accepted from the inside, and also feeds out bills for dispensing from the inside so that these can be taken out to the outside. A touch panel type operation display unit 14 is provided behind the payout unit 12 on the upper surface of the paper sheet processing device 10. The operation display unit 14 receives an operation input from the operator and performs display to the operator. The input unit 11 is provided with a shutter 13 that opens and closes this unit.

An identification unit 17 for identifying bills is provided behind the input unit 11, and a temporary storage unit 18 for temporarily storing the bills identified by the identification unit 17 is provided behind the identification unit 17.

The input unit 11 is provided with a mounting plate 19 in a rearward and downward posture (rearward and obliquely downward direction). The mounting plate 19 ascends in a rearward and upward (rearward and obliquely upward) direction and descends in a forward and downward (forward and obliquely downward) direction in the input unit 11. While the shutter 13 is in an opened state, bills accumulated on the mounting plate 19 in a descended state are placed from the outside. The bills are input into the input unit 11 in a state of being horizontally long from side to side. At that time, the bills placed on the mounting plate 19 are in a state of being accumulated in the rearward and obliquely upward direction. The mounting plate 19 ascends and lifts the bills in the accumulated state in the rearward and obliquely upward direction. The input unit 11 feeds out the bills in the accumulated state one by one from the uppermost bill in the accumulation direction into the device.

A deposit transfer path 21 for transferring bills fed out from the input unit 11 is connected to a rear end portion of the input unit 11. The deposit transfer path 21 has an inclined sending path portion 22 extending rearward and obliquely downward from the input unit 11, and a horizontal sending path portion 23 extending horizontally rearward from the rear end of the inclined sending path portion 22. The deposit transfer path 21 is connected to the identification unit 17 at a rear end portion of the horizontal sending path portion 23.

The deposit transfer path 21 is configured so that both the inclined sending path portion 22 and the horizontal sending path portion 23 are capable of transferring bills back and forth. In other words, the deposit transfer path 21 is capable of transferring bills back and forth over the entire transfer length thereof.

The identification unit 17 has an internal transfer path 25 that is arranged on the same straight line as the horizontal sending path portion 23 of the deposit transfer path 21 and extends horizontally rearward from a rear end portion of the horizontal sending path portion 23. The internal transfer path 25 continuously transfers bills rearward from the horizontal sending path portion 23. The internal transfer path 25 is capable of transferring bills back and forth over the entire transfer length thereof. The identification unit 17 is configured so as to be able to identify bills during both the transfer of bills in the first direction (one direction) from the front to the rear in the internal transfer path 25 and the transfer in the second direction (reverse direction) from the rear to the front in the internal transfer path 25. That is, the identification unit 17 can identify bills in bidirectional transfers in the first direction and the second direction which is opposite thereto. The identification unit 17 identifies the authenticity, validity, and denomination of the bill during the transfer in the internal transfer path 25, and the presence/absence of a transfer abnormality such as multi-feeding and skewing.

A linear transfer path 26 extends horizontally rearward from the rear end portion of the internal transfer path 25 of the identification unit 17. The rear end portion of the linear transfer path 26 is connected to the temporary storage unit 18. The linear transfer path 26 continuously transfers the bills rearward from the internal transfer path 25. The linear transfer path 26 is capable of transferring bills back and forth over the entire transfer length thereof. The horizontal sending path portion 23, the internal transfer path 25, and the linear transfer path 26 of the deposit transfer path 21 are linearly aligned on the same straight line. The identification unit 17 and the temporary storage unit 18 are connected by the straight linear transfer path 26. For example, a bill input into the input unit 11 is fed out from the input unit 11 and is transferred towards the identification unit 17 through the deposit transfer path 21. The transferred bill is identified by the identification unit 17 during the transfer in the first direction of the internal transfer path 25. Thereafter, the identified bill is transferred to and stored in the temporary storage unit 18 through the linear transfer path 26. That is, the identification unit 17 identifies, while allowing to pass through in the first direction, the bills fed out from the input unit 11.

As described above, all the deposit transfer path 21, the internal transfer path 25, and the linear transfer path 26 that connect the input unit 11 and the temporary storage unit 18 are capable of transferring bills back and forth. Therefore, the bills that have been fed out from the input unit 11 and passed through the identification unit 17 in the first direction can be transferred to the temporary storage unit 18. In addition to this, the bills that have been fed out from the temporary storage unit 18 and passed through the identification unit 17 in the second direction can be transferred to the input unit 11.

The temporary storage unit 18 temporarily stores the bill in a state of being feedable. That is, the temporary storage unit 18 sequentially takes in one by one, and temporarily stores, the bills transferred through the linear transfer path 26. In addition, the temporary storage unit 18 sequentially feeds out the stored bills one by one to the linear transfer path 26. The temporary storage unit 18 is a type of winding storage unit in which bills are sequentially wound around a drum together with a tape at intervals and stored, and the bills are unwound and fed out from the drum together with the tape. The temporary storage unit 18 of a winding storage type stores the bills in the order by which they are received, and feeds them out in the reverse order of the storage order. For example, the temporary storage unit 18 temporarily stores the bills fed out from the input unit 11 and identified as being acceptable by the identification unit 17 while being transferred in the first direction, and the bills temporarily stored in this manner are fed out.

A dispensing transfer path 27 branches upward from an intermediate position of the linear transfer path 26. The dispensing transfer path 27 is connected to the payout unit 12. An intermediate transfer path 28 branches upward from a position between the branch position of the dispensing transfer path 27 and the internal transfer path 25 in the linear transfer path 26. The intermediate transfer path 28 joins an intermediate position of the dispensing transfer path 27. By the branching of the dispensing transfer path 27 and the intermediate transfer path 28, the linear transfer path 26 is divided into a front side sending path portion 31, an intermediate sending path portion 32, and a rear side sending path portion 33. The front side sending path portion 31 is located on the front side from the branch position of the intermediate transfer path 28. The intermediate sending path portion 32 is located between the branch position of the intermediate transfer path 28 and the branch position of the dispensing transfer path 27. The rear side sending path portion 33 is located on the rear side from the branch position of the dispensing transfer path 27. The bills can be transferred from the intermediate sending path portion 32 to the intermediate transfer path 28 between the linear transfer path 26 and the intermediate transfer path 28. Further, the bills can be transferred from the intermediate sending path portion 32 to the dispensing transfer path 27 between the linear transfer path 26 and the dispensing transfer path 27. The intermediate transfer path 28 is capable of transferring bills only in a direction from the linear transfer path 26 towards the dispensing transfer path 27 over the entire transfer length thereof. The dispensing transfer path 27 is capable of transferring bills only in a direction towards the payout unit 12 over the entire transfer length thereof.

The dispensing transfer path 27 transfers the bills transferred through the front side sending path portion 31 and the intermediate sending path portion 32 of the linear transfer path 26 to the payout unit 12. The dispensing transfer path 27 has an upper sending path portion 35, a front upper sending path portion 36, and a front lower sending path portion 37. The upper sending path portion 35 forms a semicircular shape between the intermediate sending path portion 32 and the rear side sending path portion 33 of the linear transfer path 26 and extends upward. The front upper sending path portion 36 linearly extends forward, frontward and upward from the upper end portion of the upper sending path portion 35. The front lower sending path portion 37 slightly extends forward, frontward and downward from the front end portion of the front upper sending path portion 36 and is connected to the payout unit 12.

The payout unit 12 accumulates the bills fed out from the front lower sending path portion 37 of the dispensing transfer path 27 diagonally from the front side and lower side to the rear side and upper side. The bills accumulated in the payout unit 12 are taken out of the payout unit 12 to the outside. The dispensing transfer path 27 transfers upward in a branching manner, for example, the bills fed out from the input unit 11 and identified as being unacceptable by the identification unit 17 during transfer in the first direction from between the intermediate sending path portion 32 and the rear side sending path portion 33 of the linear transfer path 26, and releases to the payout unit 12. The payout unit 12 pays out the released bills so as to be capable of being taken out of the device. The intermediate transfer path 28 transfers upward in a branching manner, for example, the bills fed out from the temporary storage unit 18 to the linear transfer path 26 from between the intermediate sending path portion 32 and the front side sending path portion 31, and transfers to the dispensing transfer path 27. The dispensing transfer path 27 transfers, to the payout unit 12, the bills that have been transferred from the temporary storage unit 18 to the dispensing transfer path 27 via the rear side sending path portion 33, the intermediate sending path portion 32, and the intermediate transfer path 28.

The input unit 11, the payout unit 12, the operation display unit 14, the identification unit 17 including the internal transfer path 25, the temporary storage unit 18, the deposit transfer path 21, the linear transfer path 26, the dispensing transfer path 27, and the intermediate transfer path 28 described above are provided in an upper unit 40 of the paper sheet processing device 10.

A lower unit 41 is present below the upper unit 40 and is constituted of an intermediate portion to a lower portion of the paper sheet processing device 10 in the height direction. The lower unit 41 is provided with a front cassette 42 at the front position, and behind the front cassette 42, a total of eight storage units 43 are provided in two upper and lower stages and in four front and rear rows.

A vertical transfer path 46 branches downward from an intermediate position of the horizontal sending path portion 23 of the deposit transfer path 21. The vertical transfer path 46 extends downward from the horizontal sending path portion 23 and is connected to the front cassette 42. The horizontal sending path portion 23 of the deposit transfer path 21 is divided into a front side constitution unit 48 and a rear side constitution unit 49 by the vertical transfer path 46 being branched. The front side constitution unit 48 is located on the front side from the branch position of the vertical transfer path 46. The rear side constitution unit 49 is located on the rear side from the branch position of the vertical transfer path 46. Bills can be transferred back and forth between the front side constitution unit 48 and the rear side constitution unit 49, and bills can also be transferred back and forth between the vertical transfer path 46 and the rear side constitution unit 49. The vertical transfer path 46 is capable of transferring bills back and forth over the entire transfer length thereof. For example, the bills that have been fed out from the temporary storage unit 18 to the linear transfer path 26, transferred in the second direction through the internal transfer path 25 and passed through the identification unit 17 are transferred to the vertical transfer path 46. The vertical transfer path 46 transfers the bills transferred in this manner downward from the middle of the deposit transfer path 21 on the side opposite to the linear transfer path 26 of the identification unit 17 and stores them in the front cassette 42.

The front cassette 42 can take in and store the bills one by one in order, and can feed out the stored bills one by one in order. The front cassette 42 is an accumulation storage type that receives bills from the upper portion, accumulates and stores the bills in a horizontal state from bottom to top, and feeds out the stored bills from those at the upper end portion. The front cassette 42 of an accumulation storage type has a considerably higher bill storage efficiency compared with a winding storage type such as the temporary storage unit 18 and a storage unit 43 described later.

A storage transfer path 51 branches rearward from an intermediate position of the vertical transfer path 46. The storage transfer path 51 extends horizontally rearward from the vertical transfer path 46 and then extends downward in the vicinity of the rear end portion of the paper sheet processing device 10, and is connected to the storage unit 43 at the upper stage in the last row. Through this storage unit 43, the storage transfer path 51 is also connected to the storage unit 43 at the lower stage in the last row. By the branching of the storage transfer path 51, the vertical transfer path 46 is divided into an upper side sending path portion 55 on the upper side from the branch position of the storage transfer path 51 and a lower side sending path portion 56 on the lower side from the branch position of the storage transfer path 51. The storage transfer path 51 is capable of transferring bills back and forth over the entire transfer length thereof.

A plurality of, more specifically, three branch transfer paths 72, 73, and 74 branch downward from an intermediate position of the storage transfer path 51. The branch transfer path 72 is connected to the storage unit 43 in the upper stage of the front row, and, through this storage unit 43, connected to the storage unit 43 at the lower stage in the front row. The branch transfer path 73 is connected to the storage unit 43 at the upper stage in the second row from the front, and, through this storage unit 43, connected to the storage unit 43 at the lower stage in the second row from the front. The branch transfer path 74 is connected to the storage unit 43 at the upper stage in the third row from the front, and, through this storage unit 43, connected to the storage unit 43 at the lower stage in the third row from the front. The branch transfer paths 72, 73, and 74 are capable of transferring bills back and forth over each of the entire transfer lengths thereof.

All of the eight storage units 43 store bills in a feedable manner, take in and store the bills one by one in order, and feed out the stored bills one by one in order. All of the eight storage units 43 are winding storage types in which bills are sequentially wound around a drum together with a tape at intervals and stored, and the bills are unwound and fed out from the drum together with the tape, and feed out the bills while counting. The winding storage type storage units 43 store the bills in the order by which they are received, and feed them out in the reverse order of the storage order. For this reason, even in the case of storing bills of a plurality of denominations that are randomly mixed in one unit, the denomination of each bill to be stored can be figured out from the identification result of the identification unit 17. Therefore, it is possible to figure out the denomination of each bill to be fed out.

By the storage transfer path 51 and the branch transfer paths 72, 73, and 74, for example, the bills that have been fed out from the temporary storage unit 18 to the linear transfer path 26, transferred in the second direction through the internal transfer path 25 and identified by the identification unit 17 while passing through the identification unit 17 are transferred in a branching manner rearward from the middle of the vertical transfer path 46 and selectively stored in the eight storage units 43. For example, it is possible to set all of the eight storage units 43 as single denomination storage units in which bills of a single denomination are set for each, and only the set denomination bills are stored. Alternatively, some of the eight storage units 43 can be set as single denomination storage units in which bills of a single denomination are set for each, and only the bills of the set denomination are stored, while the rest can be set as mixed denomination storage units for storing bills of a plurality of denominations in a denomination-mixed manner. Here, at least one of the eight storage units 43 is set as a mixed denomination storage unit, one is set as a damaged bill storage unit for storing damaged bills, and the rest are set as single denomination storage units.

The lower unit 41 is provided with the front cassette 42, the eight storage units 43, a lower portion of the upper side sending path portion 55 of the vertical transfer path 46, the lower side sending path portion 56, the storage transfer path 51, and the branch transfer paths 72 to 74. An upper portion of the upper side sending path portion 55 of the vertical transfer path 46 is provided in the upper unit 40.

The lower unit 41 includes a casing 75 having a rectangular parallelepiped box shape that opens forward, a unit main body 76 that is arranged in the casing 75 and provided with eight storage units 43, and a lid 77 that opens and closes a front opening of the casing 75. The front cassette 42 can be pulled out forward and is detachably provided with respect to the unit main body 76.

Next, main operations of the paper sheet processing device 10 according to the present embodiment will be described.

"Deposit Process"

When an operation for starting the deposit process is input to the operation display unit 14, the paper sheet processing device 10 opens the shutter 13. When the paper sheet processing device 10 detects that a bill has been input into the input unit 11 from the outside by a sensor (not shown) in this state, after closing the shutter 13, the bill is transferred through the deposit process route indicated by a thick line in FIG. 2A. At this time, the input unit 11 separates and feeds out the bills one by one. The bills that have been fed out are transferred by the deposit transfer path 21, the internal transfer path 25 of the identification unit 17, and the front side sending path portion 31 and the intermediate sending path portion 32 of the linear transfer path 26. The identification unit 17 identifies the bills one by one during transfer in the first direction of the internal transfer path 25 at this time. The bills that the identification unit 17 has identified as being acceptable are transferred to the temporary storage unit 18 by the intermediate sending path portion 32 and the rear side sending path portion 33 of the linear transfer path 26, and temporarily stored by the temporary storage unit 18 (see a thick solid line in FIG. 2A). On the other hand, the bills that the identification unit 17 has identified as being unacceptable are transferred to the payout unit 12 by the intermediate sending path portion 32 and the dispensing transfer path 27 of the linear transfer path 26 (see, from the thick solid line to the thick broken line in FIG. 2A).

Since the input unit 11 separates and feeds out the bills that are in a state of being accumulated in the thickness direction, there is a possibility that a transfer abnormality such as multi-feeding and skewing may occur at the time of feeding out. Such abnormally transferred bills are also transferred to the payout unit 12 while being identified by the identification unit 17 as being unacceptable during the transfer in the first direction of the internal transfer path 25 at this time. When all the bills input into the input unit 11 have been transferred to either the temporary storage unit 18 or the payout unit 12, the paper sheet processing device 10 displays, on the operation display unit 14, the information on the amount of money such as the number, for each denomination, and the total amount of the bills temporarily stored in the temporary storage unit 18 based on the identification result by the identification unit 17. The bills transferred to the payout unit 12 can be taken out from the outside.

"Storage Process"

Figure 2A:
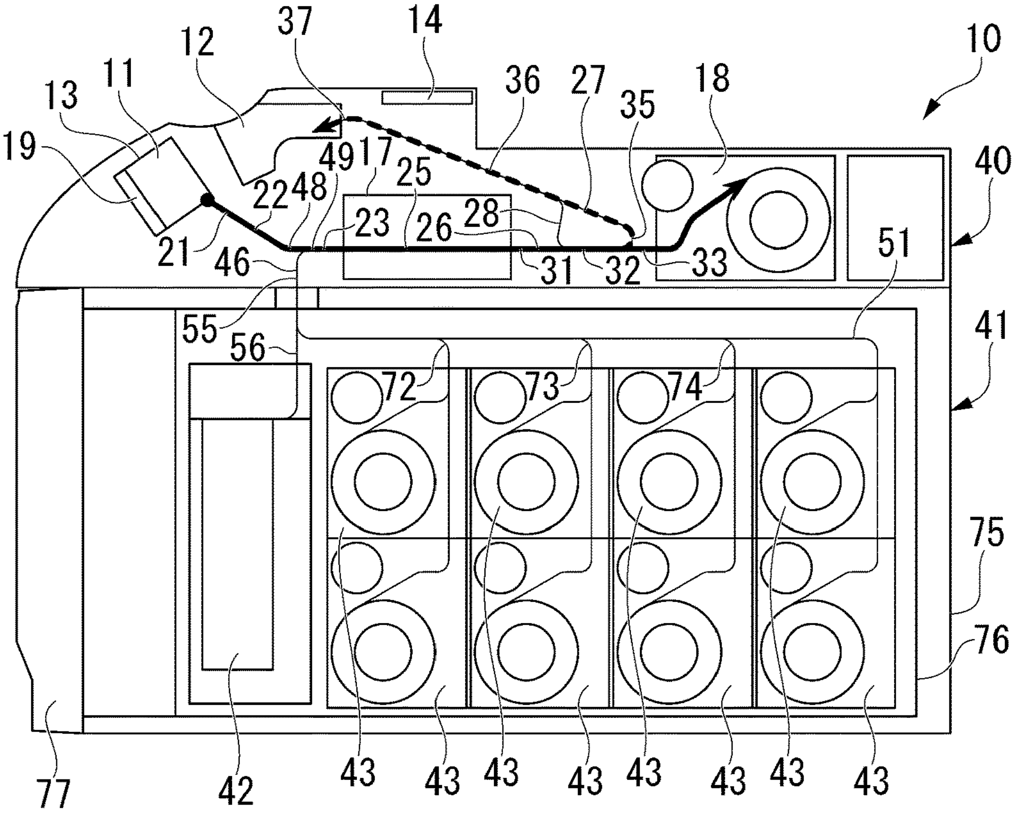
FIG. 2A is a side view schematically showing a deposit process route, a former stage route of an arrangement and counting process, and a former stage route of a deposit port replenishment process in the paper sheet processing device according to an embodiment of the present invention.
Figure 2B:
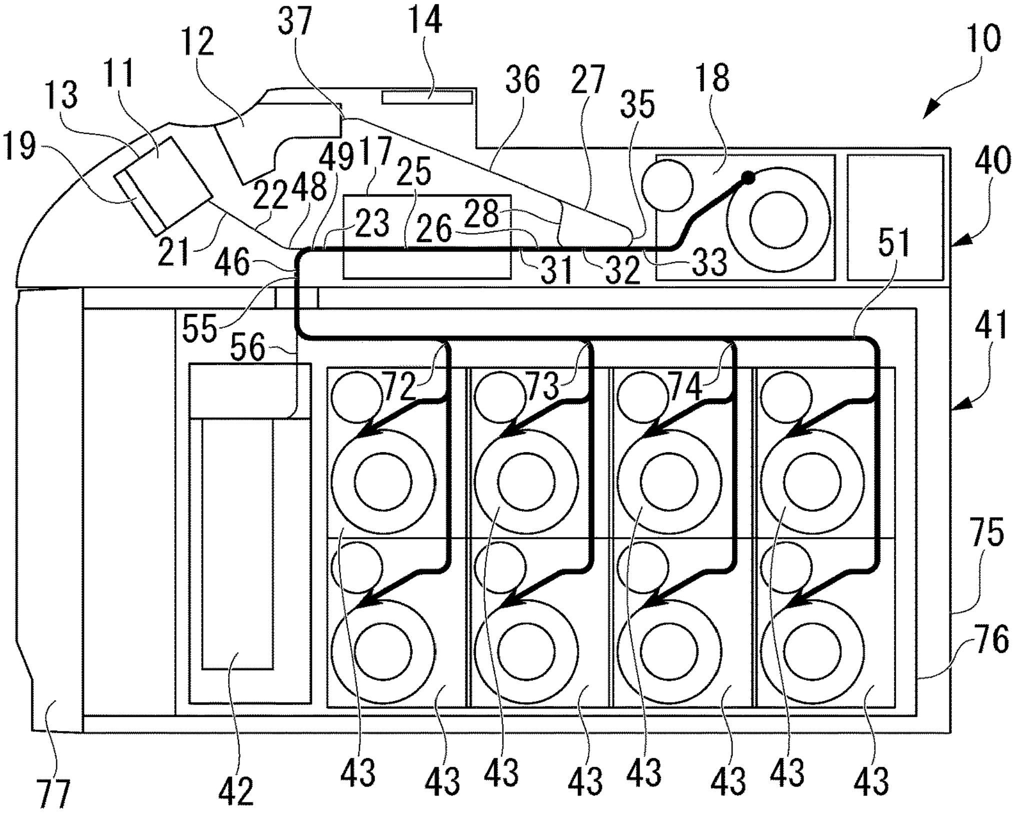
FIG. 2B is a side view schematically showing a storage process route, an abnormal bill storage route, a later stage route of a dispensing evacuation process, a later stage route of the deposit port replenishment process, and a later stage route of a cassette replenishment process in the paper sheet processing device according to an embodiment of the present invention.

After the deposit process, that is, after the information on the amount of money is displayed on the operation display unit 14, when the operator inputs an approval operation to the operation display unit 14, the paper sheet processing device 10 transfers bills through the storage process route indicated by a thick line in FIG. 2B. That is, the bills temporarily stored in the temporary storage unit 18 are fed out one by one from the temporary storage unit 18 and transferred by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills one by one during transfer in the second direction of the internal transfer path 25 at this time. Based on the identification result of the identification unit 17, the bills are sorted into any one of the eight storage units 43 selected by any one of the storage transfer path 51 and the branch transfer paths 72 to 74 selected. The sorted bills are stored in any of the corresponding storage units 43 among the eight storage units 43. At this time, the bills identified by the identification unit 17 as normal bills and damaged bills are stored in the storage unit 43 set as the damaged bill storage unit. Although a transfer abnormality such as skewing is less likely to occur at the time of feeding out since the temporary storage unit 18 is of a winding storage type, when the identification unit 17 detects a transfer abnormality and when the identification unit 17 causes an identification abnormality, these abnormal bills are stored in the storage unit 43 set as the damaged bill storage unit.

"Return Process"

Figure 3:
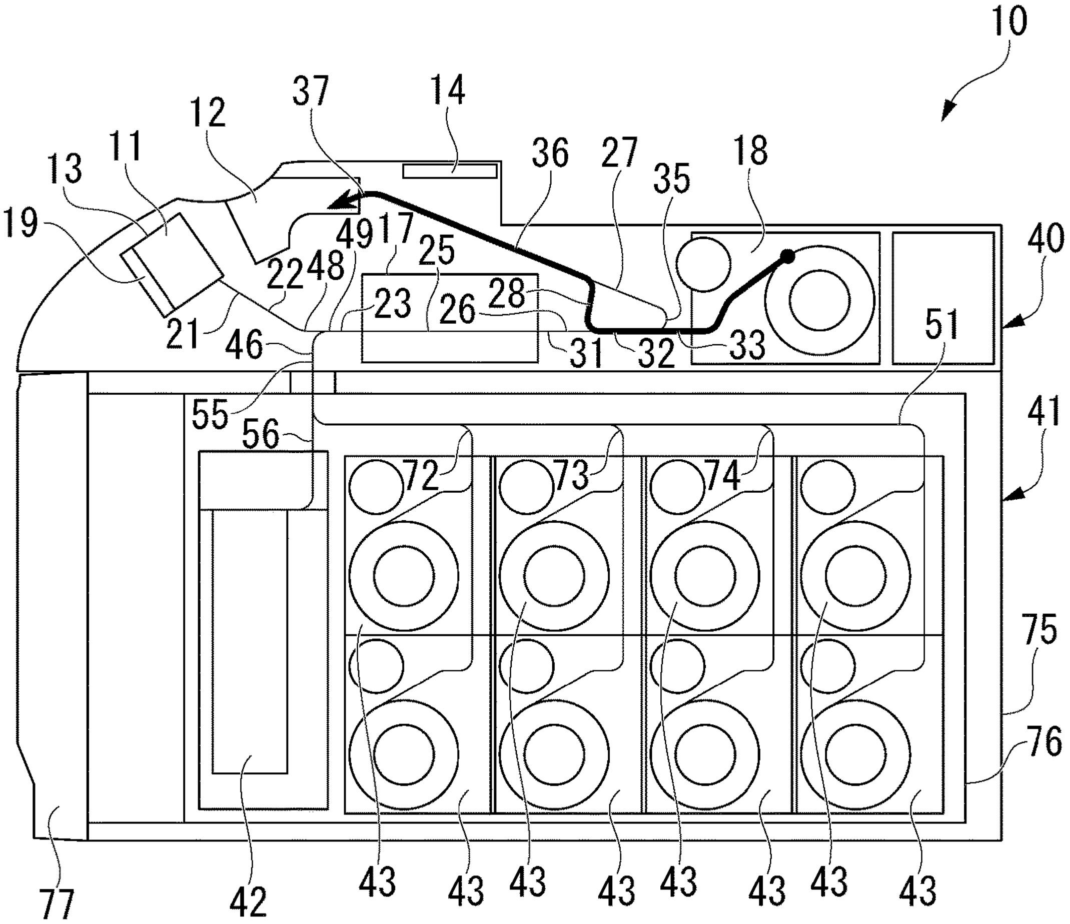
FIG. 3 is a side view schematically showing a return process route and a later stage route of the arrangement and counting process in the paper sheet processing device according to an embodiment of the present invention.

After the deposit process, that is, after the information on the amount of money is displayed on the operation display unit 14, when the operator inputs a return operation to the operation display unit 14, the paper sheet processing device 10 transfers bills through the return process route indicated by a thick line in FIG. 3. That is, the bills temporarily stored in the temporary storage unit 18 are fed out one by one from the temporary storage unit 18, and transferred to the payout unit 12 by the rear side sending path portion 33 of the linear transfer path 26, the intermediate sending path portion 32, the intermediate transfer path 28, and the dispensing transfer path 27. The bills transferred to the payout unit 12 can be taken out (returned) from the outside.

"Arrangement and Counting Process"

When a denomination designation is input to the operation display unit 14 and then an operation for starting the arrangement and counting process is input, the paper sheet processing device 10 opens the shutter 13. When the sensor detects that a bill has been input into the input unit 11 from the outside in this state, the paper sheet processing device 10 closes the shutter 13 and then transfers the bills through the former stage route of the arrangement and counting process similar to the deposit process route indicated by the thick line in FIG. 2A. That is, the input unit 11 separates and feeds out the bills one by one, and the fed out bills are transferred by the deposit transfer path 21, the internal transfer path 25 of the identification unit 17, and the front side sending path portion 31 and the intermediate sending path portion 32 of the linear transfer path 26. The identification unit 17 identifies the bills during transfer in the first direction of the internal transfer path 25 at this time. The bills identified by the identification unit 17 as the designated denomination are transferred to the temporary storage unit 18 by the linear transfer path 26 and temporarily stored by the temporary storage unit 18 (see the thick solid line in FIG. 2A). On the other hand, the bills (including abnormally transferred bills) that the identification unit 17 has identified as being other than the designated denomination are transferred from the front side sending path portion 31 and the intermediate sending path portion 32 of the linear transfer path 26 to the dispensing transfer path 27, and are further transferred to the payout unit 12 by the dispensing transfer path 27 (see, from the thick solid line to the thick broken line in FIG. 2A). The bills transferred to the payout unit 12 can be taken out from the outside.

When all the bills input into the input unit 11 have been transferred to either the temporary storage unit 18 or the payout unit 12, on condition that the bills in the payout unit 12 have been taken out, the paper sheet processing device 10 transfers bills through the later stage route of the arrangement and counting process similar to the return process route indicated by the thick line in FIG. 3. That is, the temporary storage unit 18 feeds out the temporarily stored bills and transfers to the payout unit 12 by the rear side sending path portion 33 of the linear transfer path 26, the intermediate sending path portion 32, the intermediate transfer path 28, and the dispensing transfer path 27. The paper sheet processing device 10 displays, on the operation display unit 14, the information on the amount of money such as the denomination, the number, and the total amount of bills of the set denomination transferred to the payout unit 12, based on the identification result by the identification unit 17 in the former stage route. The bills transferred to the payout unit 12 can be taken out from the outside. Here, since only the bills identified by the identification unit 17 as being the designated denomination in the former stage route are temporarily stored in the temporary storage unit 18, the bills transferred from the temporary storage unit 18 to the payout unit 12 in the later stage route correspond to the identification result by the identification unit 17 in the former stage route, and the identification by the identification unit 17 in the later stage route will be unnecessary.

"Dispensing Process"

Figure 4:
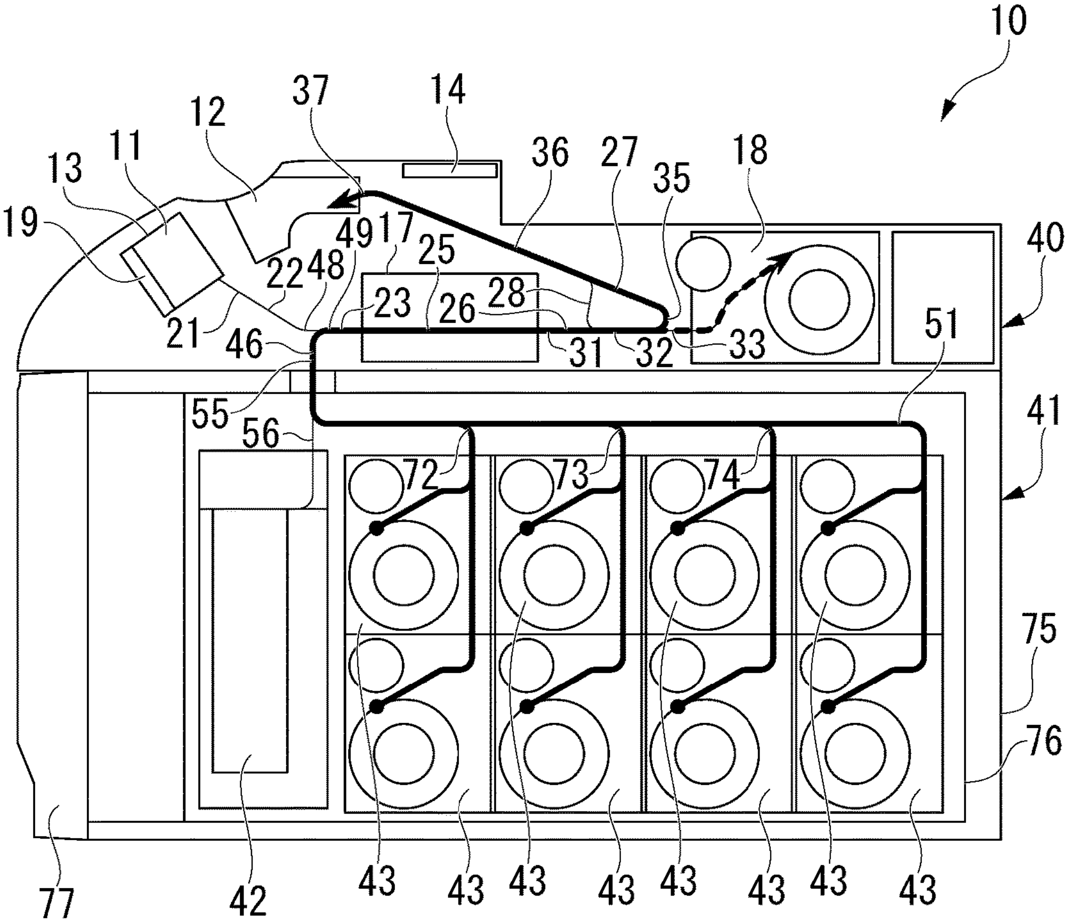
FIG. 4 is a side view schematically showing a dispensing process route and a former stage route of the dispensing evacuation process in the paper sheet processing device according to an embodiment of the present invention.

When the selection operation of the dispensing process is input to the operation display unit 14 together with the information on the amount of money of the bill to be dispensed and the bills are dispensed from the storage unit 43 set as the single denomination storage unit, the paper sheet processing device 10 transfers the bills through the dispensing process route indicated by the thick line in FIG. 4 from the storage unit 43 in which the bills of the denomination to be dispensed are stored. That is, one of the storage units 43 feeds out, while counting, the stored bills. The fed out bills are transferred to the payout unit 12 by any one of the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, the front side sending path portion 31 of the linear transfer path 26, the intermediate sending path portion 32, and the dispensing transfer path 27 (see the thick solid line in FIG. 4). The paper sheet processing device 10 confirms the information on the amount of money of the bill to be dispensed based on the identification result of the identification unit 17 at that time. The bills transferred to the payout unit 12 can be taken out from the outside.

Since all the storage units 43 are of a winding storage type, a transfer abnormality such as skewing is less likely to occur at the time of feeding out. However, the bills in which a transfer abnormality is detected by the identification unit 17 and the abnormal bills in which an identification abnormality is generated in the identification unit 17 are temporarily stored in the temporary storage unit 18 by the front side sending path portion 31, the intermediate sending path portion 32, and the rear side sending path portion 33 of the linear transfer path 26 (see, from the thick solid line to the thick broken line in FIG. 4). At the end of the dispensing process, the paper sheet processing device 10 feeds out the abnormal bills from the temporary storage unit 18 and stores them in the storage unit 43 set as the damaged bill storage unit through an abnormal bill storage route similar to the storage process route indicated by the thick line in FIG. 2B.

"Dispensing Evacuation Process"

When bills are dispensed from the storage unit 43 set as the mixed denomination storage unit, the paper sheet processing device 10 transfers the bills through the former stage route of the dispensing evacuation process similar to the dispensing process route indicated by the thick line in FIG. 4. At that time, the paper sheet processing device 10 transfers the bills to be dispensed that are fed out from the storage unit 43 set as the mixed denomination storage unit to the payout unit 12 by any one of the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, the front side sending path portion 31 of the linear transfer path 26, the intermediate sending path portion 32, and the dispensing transfer path 27. In addition, the paper sheet processing device 10 transfers the bills other than those to be dispensed that are fed out from the storage unit 43 set as the mixed denomination storage unit to the temporary storage unit 18 by any one of the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, and the linear transfer path 26, and temporarily stores in the temporary storage unit 18. The bills transferred to the payout unit 12 can be taken out from the outside.

After transferring all the bills to be dispensed to the payout unit 12, the paper sheet processing device 10 then transfers the bills through the later stage route of the dispensing evacuation process similar to the storage process route indicated by the thick line in FIG. 2B. That is, the bills other than those to be dispensed that have been temporarily stored are fed out by the temporary storage unit 18, and transferred by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills during transfer in the second direction of the internal transfer path 25 at this time. Based on the identification result of the identification unit 17, the bills are sorted into the storage units assigned to the identified bills among the eight storage units 43 including the storage unit 43 set as the damaged bill storage unit by any one of the storage transfer path 51 and the branch transfer paths 72 to 74 selected. The sorted bills are stored in one assigned storage unit 43.

"Self-Examination Process"

Figure 5A:
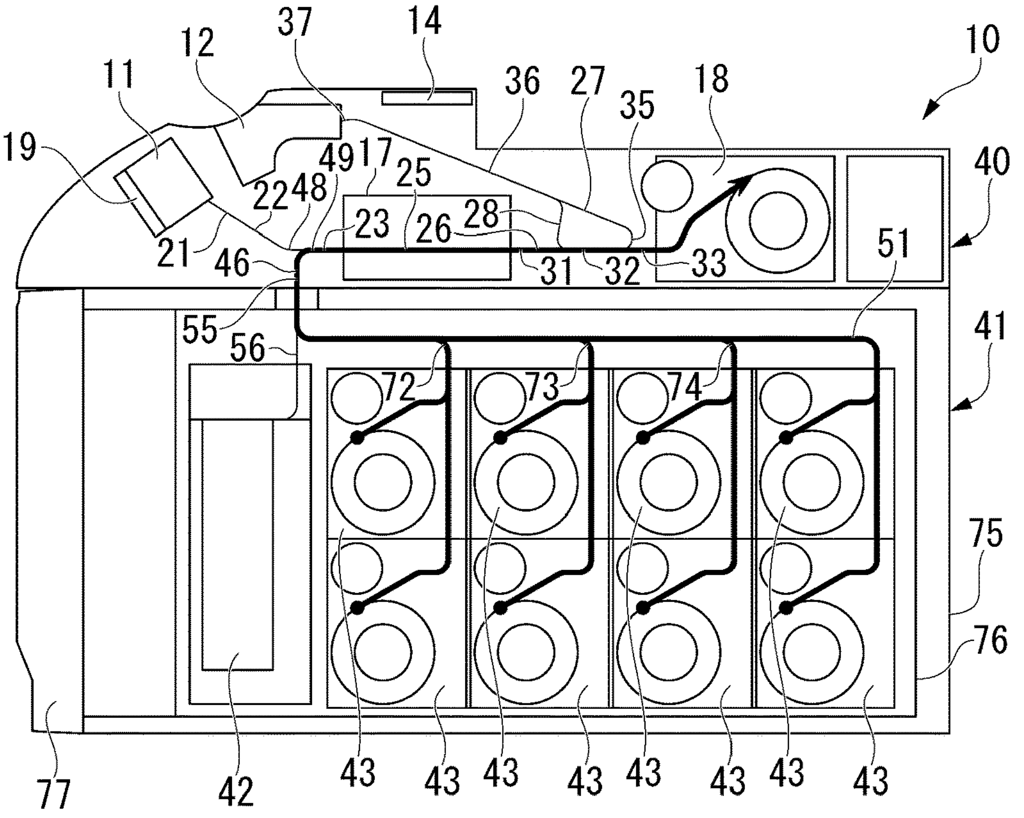
FIG. 5A is a side view schematically showing a forward route of a self-examination process and a former stage route of a recovery process in the paper sheet processing device according to an embodiment of the present invention.

When a selection operation for a self-examination process is input to the operation display unit 14, the paper sheet processing device 10 first transfers the bill through the outward route of the self-examination process indicated by the thick line in FIG. 5A. That is, when the storage units 43 other than the damaged bill storage unit among the eight storage units 43 are to be examined, one of the storage units 43 to be examined feeds out the bill. The paper sheet processing device 10 transfers the fed out bills to the temporary storage unit 18 by any one of the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, and the linear transfer path 26, to be temporarily stored by the temporary storage unit 18. The identification unit 17 does not identify the bills during transfer in the first direction of the internal transfer path 25 at this time. In this manner, all the bills stored in the one storage unit 43 to be examined are transferred to the temporary storage unit 18.

Figure 5B:
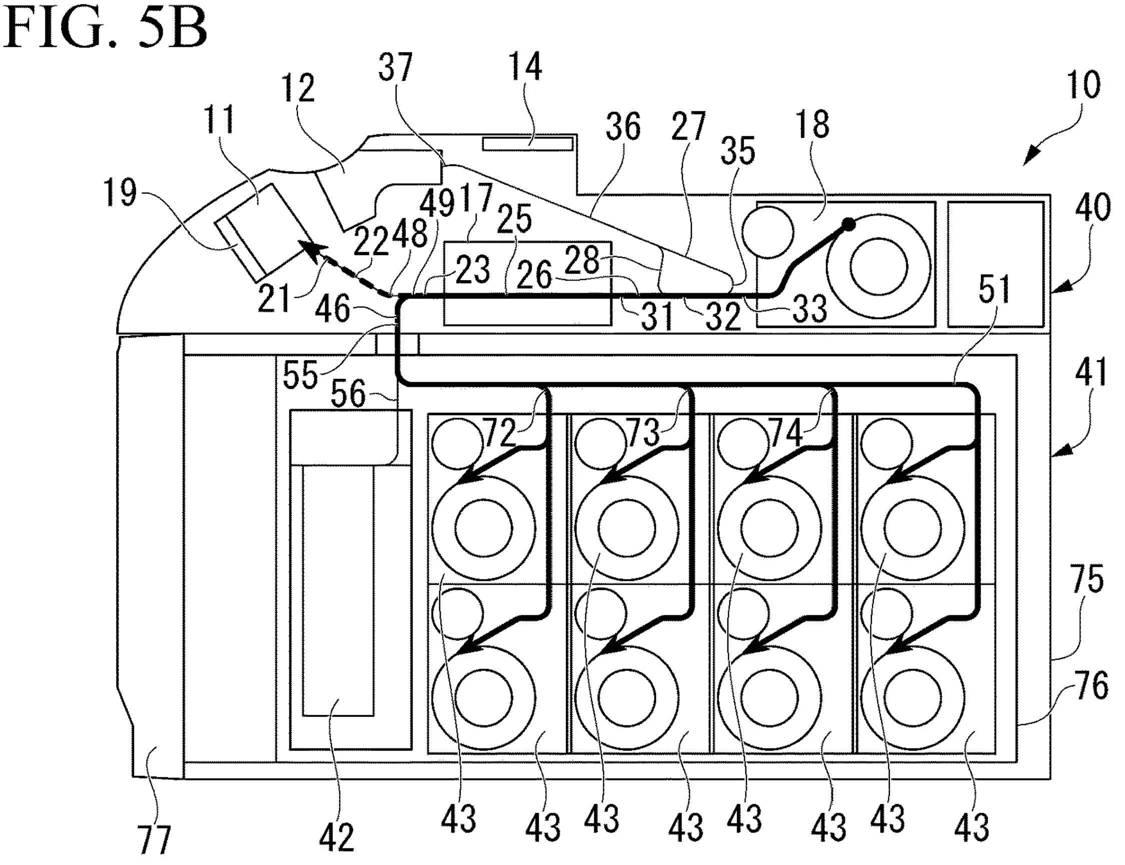
FIG. 5B is a side view schematically showing a return route of the self-examination processing in the paper sheet processing device of an embodiment according to the present invention.

Next, the paper sheet processing device 10 transfers the bills through the return route of the self-examination process indicated by the thick line in FIG. 5B. That is, the bills temporarily stored in the temporary storage unit 18 are fed out one by one from the temporary storage unit 18 and transferred by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills during transfer in the second direction of the internal transfer path 25 at this time. Any one of the storage transfer path 51 and the branch transfer paths 72 to 74 selected based on the identification result of the identification unit 17 transfers the bills to, and stores them in, any one of the storage unit 43 selected, among the eight storage units 43, based on the identification result (see the thick solid line in FIG. 5B). Here, during the transfer in the second direction on the return route of the self-examination process, the identification unit 17 identifies an abnormality in the bills, an abnormality in the transfer, or the like. When such an abnormality is detected and there are abnormal bills whose denominations and the number of sheets cannot be determined, the paper sheet processing device 10 transfers the abnormal bills to and stores them in the storage unit 43 assigned as the damaged bill storage unit by any one of the storage transfer path 51 and the branch transfer paths 72 to 74.

When all the bills temporarily stored in the temporary storage unit 18 have been transferred to any of the eight storage units 43, the paper sheet processing device 10 determines the information on the number of bills stored in the storage unit 43 to be examined, that is, the information on the amount of money, from the identification result of the identification unit 17 at this time. In addition, also for the storage units 43 other than those to be examined, the increment is added to the amount on hand.

As described above, in the self-examination process, the paper sheet processing device 10 feeds out the bills in the storage unit 43 from the storage unit 43 and temporarily stores them in the temporary storage unit 18. Thereafter, the paper sheet processing device 10 identifies the bills stored in the temporary storage unit 18 by the identification unit 17 while feeding them out from the temporary storage unit 18 and allowing to pass through the identification unit 17 in the second direction. They are stored in any one of the storage units 43 according to the identification result.

The same process as described above is performed for all the storage units 43 other than the storage unit 43 set as the damaged bill storage unit, and the individual information on the amount of money of all the storage units 43 to be examined is determined.

When the storage unit 43 set as the damaged bill storage unit is to be examined, a selection operation for the self-examination process for this storage unit 43 is input to the operation display unit 14. In this case, the paper sheet processing device 10 first transfers the bills from the storage unit 43 set as the damaged bill storage unit through the outward route of the self-examination process indicated by the thick line in FIG. 5A. That is, the paper sheet processing device 10 feeds out the bills from the storage unit 43 set as the damaged bill storage unit and transfers the fed out bills to the temporary storage unit 18 by any one of the branch transfer paths 72 to 74 corresponding to the damaged bill storage unit, the storage transfer path 51, the upper side sending path portion 55 of the vertical transfer path 46, the rear side constitution unit 49 of the deposit transfer path 21, the internal transfer path 25 of the identification unit 17, and the linear transfer path 26. The transferred bills are temporarily stored in the temporary storage unit 18. Also at this time, the identification unit 17 does not identify the bills during transfer in the first direction of the internal transfer path 25. In this manner, all the bills stored in the damaged bill storage unit to be examined are transferred to the temporary storage unit 18.

Next, the bills are transferred by the return route of the self-examination process indicated by the thick line in FIG. 5B. That is, in the paper sheet processing device 10, the temporarily stored bills are fed out by the temporary storage unit 18 and are transferred by the linear transfer path 26 and the internal transfer path 25 of the identification unit 17. The identification unit 17 identifies the bills during transfer in the second direction of the internal transfer path 25 at this time. The normal bills other than the bills determined as being abnormal are transferred to any one of the eight storage units 43 selected based on the identification result by any one of the rear side constitution unit 49 of the deposit transfer path 21, the upper side sending path portion 55 of the vertical transfer path 46, the storage transfer path 51, and the branch transfer paths 72 to 74 selected based on the identification result of the identification unit 17, and are stored in this storage unit 43 (see the thick solid line in FIG. 5B). In this case, the damaged bill is stored again in the storage unit 43 set as the damaged bill storage unit.

During the transfer in the second direction of the internal transfer path 25 in the return route of the self-examination process for the storage unit 43 set as the damaged bill storage unit, the identification unit 17 identifies an abnormality in the bills, an abnormality in the transfer, or the like. When there is an abnormal bill in which such an abnormality is detected, the paper sheet processing device 10 transfers the abnormal bill to the input unit 11 in which the shutter 13 is in a closed state by the horizontal sending path portion 23 and the inclined sending path portion 22 of the deposit transfer path 21 (see, from the thick solid line to the thick broken line in FIG. 5B).

When all the bills temporarily stored in the temporary storage unit 18 have been transferred to any of the eight storage units 43 and the input unit 11, if there is no abnormal bill that is identified as being abnormal by the identification unit 17 and is transferred to the input unit 11 in which the shutter 13 is in a closed state, from the identification result of the identification unit 17 at this time, the paper sheet processing device 10 determines the information on the number of bills, that is, the information on the amount of money, stored in the damaged bill storage unit to be examined. In addition, also for the storage units 43 other than those to be examined, the increment is added to the amount on hand.

"Self-Examination Retry Process"

Figure 6A:
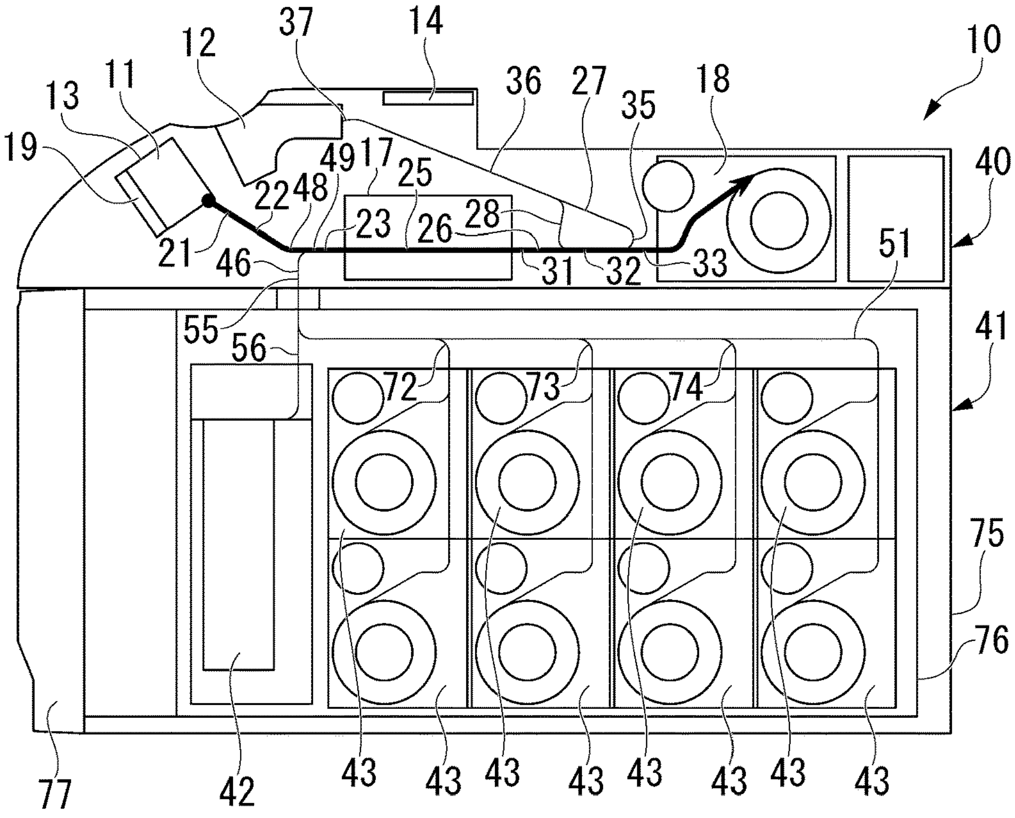
FIG. 6A is a side view schematically showing a former stage route of a self-examination retry process in the paper sheet processing device according to an embodiment of the present invention.

On the other hand, in the return route of the self-examination process of the damaged bill storage unit, if there is a bill that is identified as being abnormal by the identification unit 17 and is transferred to the input unit 11 in which the shutter 13 is in a closed state, the paper sheet processing device 10 transfers the bill through the former stage route of the self-examination retry process indicated by the thick line in FIG. 6A. In other words, the paper sheet processing device 10 separates and feeds out the bills one by one from the input unit 11 while the shutter 13 remains closed. The fed out bills are transferred to the temporary storage unit 18 by the deposit transfer path 21, the internal transfer path 25 of the identification unit 17, and the linear transfer path 26, and are temporarily stored in the temporary storage unit 18. Also at this time, the identification unit 17 does not identify the bills during transfer in the first direction of the internal transfer path 25.

Figure 6B:
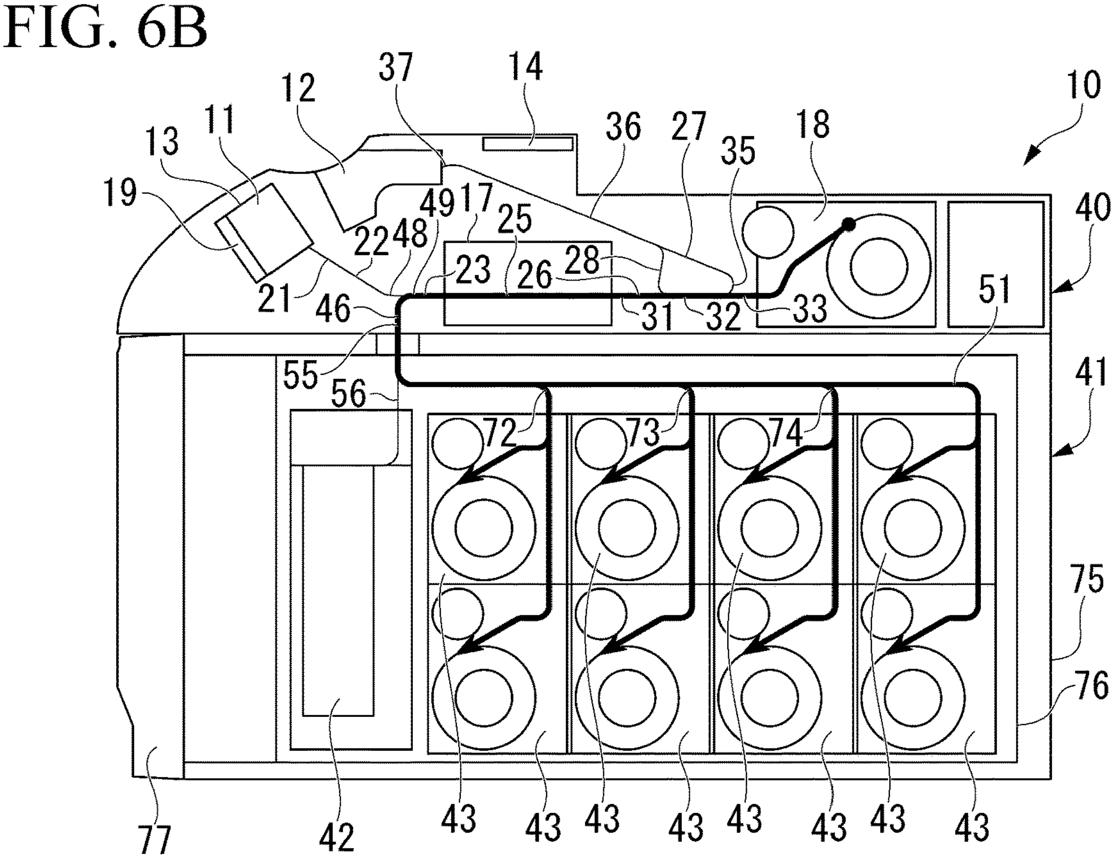
FIG. 6B is a side view schematically showing a later stage route of the self-examination retry process in the paper sheet processing device of an embodiment according to the present invention.

Next, the paper sheet processing device 10 transfers the bills through the later stage route of the self-examination retry process indicated by the thick line in FIG. 6B. That is, the paper sheet processing device 10 feeds out the bills that have been temporarily stored from the temporary storage unit 18 and transfers them by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills during transfer in the second direction of the internal transfer path 25 at this time. Based on the identification result, the paper sheet processing device 10 transfers the bills to, and store them in, the storage unit selected based on the identification result among the eight storage units 43, by any one of the storage transfer path 51, and the branch transfer paths 72 to 74 (see the thick solid line in FIG. 6B). On the other hand, during the transfer in the second direction of the internal transfer path 25 in the later stage route of the self-examination retry process, the identification unit 17 identifies an abnormality in the bills, an abnormality in the transfer, or the like. When such an abnormality is detected, the paper sheet processing device 10 stores the abnormal bill in the damaged bill storage unit.

By the self-examination retry process described above, the paper sheet processing device 10 can re-identify the bill that is once identified as an abnormal bill during the self-examination process and stored in the storage unit 43 set as the damaged bill storage unit. In this self-examination retry process, if the bill to be processed is identified as a normal bill (including a damaged bill), it is stored in the storage unit 43 corresponding to the identification result.

When all the bills temporarily stored in the temporary storage unit 18 have been transferred to any of the eight storage units 43, the paper sheet processing device 10 determines the information on the number of damaged bills that are normal bills stored in the damaged bill storage unit to be examined, that is, the information on the amount of money, from the identification result of the identification unit 17 at this time. In addition, also for the storage units 43 other than those to be examined, the increment is added to the amount on hand.

It should be noted that in the embodiment described above, in the later stage route of the self-examination retry process indicated in FIG. 6B, when an abnormal bill is detected by the identification unit 17 during the transfer in the second direction of the internal transfer path 25, the paper sheet processing device 10 stores the abnormal bill in the damaged bill storage unit. However, in another embodiment, the paper sheet processing device 10 may transfer such an abnormal bill again to the input unit 11 and perform the self-examination retry process once again. Even if the self-examination retry process is performed a predetermined number of times, the abnormal bills identified as being abnormal are stored in the storage unit 43 set as the damaged bill storage unit.

As described above, the paper sheet processing device 10 transfers, to the input unit 11, the abnormal bill that is fed out from the temporary storage unit 18 and identified as being abnormal by the identification unit 17 when allowed to pass through the identification unit 17 in the second direction during the self-examination process of the damaged bill storage unit. Thereafter, the paper sheet processing device 10 feeds out the bills transferred from the input unit 11 and returns them to the temporary storage unit 18 while allowing to pass through the identification unit 17 in the first direction in the former stage route of the self-examination retry process. Next, the paper sheet processing device 10 identifies the bills stored in the temporary storage unit 18 by the identification unit 17 while feeding them out from the temporary storage unit 18 and allowing to pass through the identification unit 17 in the second direction in the later stage route of the self-examination retry process. Then, the identified bill is stored in the storage unit 43 selected based on the identification result.

When the storage unit 43 set as the damaged bill storage unit is to be examined, if the abnormal bill remains in the storage unit 43 even when the self-examination retry process described above is performed, the total amount on hand in the storage unit 43 cannot be determined. For this reason, in order to determine the total amount on hand in the storage unit 43 set as the damaged bill storage unit, the paper sheet processing device 10 feeds out the abnormal bill from the storage unit 43, and the fed out abnormal bill may be transferred to the payout unit 12 by any one of the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, the front side sending path portion 31 of the linear transfer path 26, the intermediate sending path portion 32, and the dispensing transfer path 27. By doing so, the amount on hand can be manually corrected by re-inputting the abnormal bill into the input unit 11 or by examining it manually.

When the input unit 11 is dedicated to deposit, the input unit 11 only has a feeding mechanism that separates the bills and feeds them out into the device one by one, and does not include a mechanism such as an impeller for accumulating the bills when feeding them out in the input unit 11. In such a case, the paper sheet processing device 10 controls the feeding interval of the bills so as to be intermittent feeding (for example, intermittent feeding every 200 ms) in order to suppress the bill accumulation abnormality in the input unit 11. Alternatively, the bills may be accumulated by using the mounting plate 19 as a bill accumulation stage and lowering it by a predetermined amount, each time one bill is fed to the input unit 11. Furthermore, accumulation abnormalities may be reduced by lifting the mounting plate 19 by a predetermined amount to align the bills when accumulating a predetermined number of bills.

In addition, by setting a limit on the number of identification adjustment sheets that is fed out to the input unit 11, it is possible to suppress the possibility of generating an accumulation abnormality to a low level. In other words, when a predetermined number of identification adjustment sheets are fed out, it is also possible to control so that the bills are extracted from the input unit 11.

In the above description, it is configured so that during the self-examination process of the storage units 43 other than the storage unit set as the damaged bill storage unit, the abnormal bills identified as being abnormal by the identification unit 17 are stored in the storage unit 43 set as the damaged bill storage unit, and the self-examination retry process is performed only during the self-examination process of this storage unit 43. However, the same self-examination retry process may be performed on the abnormal bill identified as being abnormal by the identification unit 17 during the self-examination process of the storage unit 43 other than those set as the damaged bill storage unit. In other words, during the self-examination process of the storage units 43 other than the storage unit set as the damaged bill storage unit, the abnormal bills are temporarily saved in the temporary storage unit 18 in the former stage route of the self-examination process and then the abnormal bills fed out from the temporary storage unit 18 and identified as being abnormal by the identification unit 17 are transferred to the input unit 11 in the later stage route of the self-examination process. Thereafter, in the former stage route of the self-examination retry process, the bills are fed out from the input unit 11 and returned to the temporary storage unit 18. Then, in the later stage route of the self-examination retry process, the bills in the temporary storage unit 18 are stored in the corresponding storage unit 43 after being fed out from the temporary storage unit 18 and identified by the identification unit 17.

"Cassette Replenishment Process"

Figure 7:
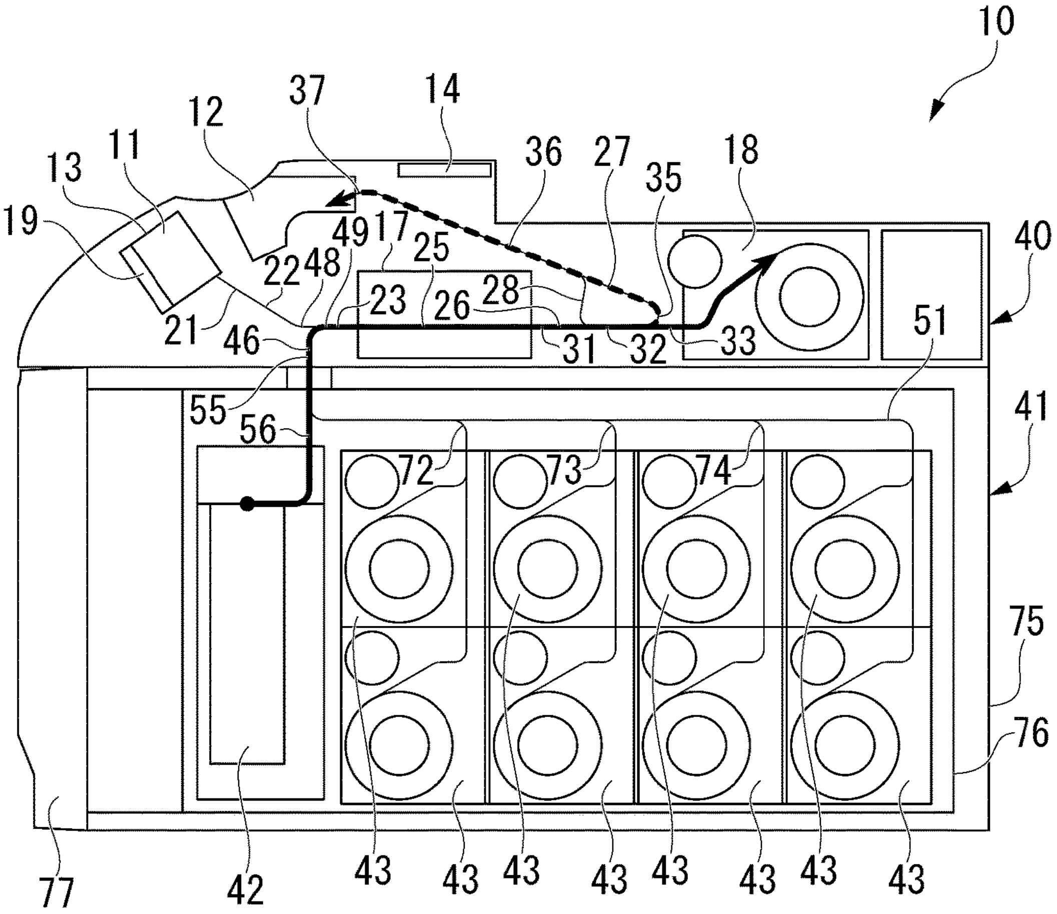
FIG. 7 is a side view schematically showing a former stage route of a cassette replenishment process in the paper sheet processing device of an embodiment according to the present invention.

With reference to FIG. 7, cassette replenishment to the paper sheet processing device 10 is performed as follows. First, when replenishing a cassette, bills are stored in the front cassette 42 outside the device. Next, the lid 77 of the paper sheet processing device 10 is opened, and the unit main body 76 is pulled out from the casing 75. This front cassette 42 is attached to the unit main body 76 by replacing the front cassette 42 that has been attached until then.

When a selection operation for the cassette replenishment process is input to the operation display unit 14, the paper sheet processing device 10 transfers bills through the former stage route of the cassette replenishment process indicated by the thick line in FIG. 7. That is, the bills are fed out from the front cassette 42, and the fed out bills are transferred by the vertical transfer path 46, the rear side constitution unit 49 of the deposit transfer path 21, the internal transfer path 25 of the identification unit 17, and the front side sending path portion 31 and the intermediate sending path portion 32 of the linear transfer path 26. The identification unit 17 identifies the bills while the bills are being transferred in the first direction in the internal transfer path 25 at this time. The bills that are identified as being acceptable based on the identification result are transferred to the temporary storage unit 18 by the rear side sending path portion 33 of the linear transfer path 26. The transferred bills are temporarily stored in the temporary storage unit 18 (see the thick solid line in FIG. 7). Since the front cassette 42 is of an accumulation storage type, there is a possibility of transfer abnormalities such as multi-feeding and skewing of the bills being fed out. The bills that are identified as being unacceptable including such abnormally transferred bills are transferred from the intermediate sending path portion 32 of the linear transfer path 26 to the dispensing transfer path 27, and are further transferred to the payout unit 12 (see, from the thick solid line to the thick broken line in FIG. 7). The bills transferred to the payout unit 12 can be taken out from the outside.

Since the storage capacity of the front cassette 42 is larger than the storage capacity of the temporary storage unit 18, the temporary storage unit 18 may become full before the front cassette 42 becomes empty. When the front cassette 42 becomes empty or the temporary storage unit 18 becomes full, the paper sheet processing device 10 transfers bills through the later stage route of the cassette replenishment process similar to the storage process route indicated by the thick line in FIG. 2B. That is, the bills temporarily stored in the temporary storage unit 18 are fed out by the temporary storage unit 18, and transferred by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills while the bills are being transferred in the second direction in the internal transfer path 25 at this time. Thereafter, the bills including the damaged bills and the abnormal bills are sorted into the storage unit corresponding to the identification result of the identification unit 17 among the eight storage units 43, by one transfer path selected based on the identification result of the identification unit 17 among the storage transfer path 51 and the branch transfer paths 72 to 74. The sorted bills are stored in the corresponding storage unit 43.

The process described above is appropriately repeated until the front cassette 42 becomes empty. In this manner, the bills stored in the front cassette 42 are respectively sorted and stored in the storage units corresponding to the identification result of the identification unit 17 among the eight storage units 43.

"Deposit Port Replenishment Process"

When a selection operation for the deposit port replenishment process is input to the operation display unit 14, the paper sheet processing device 10 first transfers bills through the former stage route of the deposit port replenishment process similar to the deposit process route indicated by the thick line in FIG. 2A. That is, first, the input unit 11 separates and feeds out the bills one by one. The bills fed out from the input unit 11 are transferred by the deposit transfer path 21, the internal transfer path 25 of the identification unit 17, and the front side sending path portion 31 and the intermediate sending path portion 32 of the linear transfer path 26. The identification unit 17 identifies the bills while the bills are being transferred in the first direction in the internal transfer path 25 at this time. The bills that the identification unit 17 has identified as being acceptable are transferred from the intermediate sending path portion 32 to the rear side sending path portion 33 of the linear transfer path 26, and are further transferred to the temporary storage unit 18. The transferred bills are temporarily stored in the temporary storage unit 18 (see the thick solid line in FIG. 2A). On the other hand, the bills that the identification unit 17 has identified as being unacceptable (including abnormally transferred bills) are transferred from the intermediate sending path portion 32 of the linear transfer path 26 to the dispensing transfer path 27, and are further transferred to the payout unit 12 (see, from the thick solid line to the thick broken line in FIG. 2A). The bills transferred to the payout unit 12 can be taken out from the outside.

When all the bills input into the input unit 11 have been transferred to either the temporary storage unit 18 or the payout unit 12, the paper sheet processing device 10 transfers the bills through the later stage route of the deposit port replenishment process similar to the storage process route indicated by the thick line in FIG. 2B. That is, the bills temporarily stored in the temporary storage unit 18 are fed out by the temporary storage unit 18. The fed out bills are transferred by the linear transfer path 26, the internal transfer path 25 of the identification unit 17, the rear side constitution unit 49 of the deposit transfer path 21, the upper side sending path portion 55 of the vertical transfer path 46 and the storage transfer path 51. The identification unit 17 identifies the bills while the bills are being transferred in the second direction in the internal transfer path 25 at this time. Thereafter, the bills including the damaged bills and the abnormal bills are sorted into the storage unit corresponding to the identification result of the identification unit 17 among the eight storage units 43, by one transfer path selected based on the identification result of the identification unit 17 among the storage transfer path 51 and the branch transfer paths 72 to 74. The sorted bills are stored in the corresponding storage unit 43. In this manner, the bills inserted into the input unit 11 are respectively sorted and stored in the storage units corresponding to the identification result of the identification unit 17 among the eight storage units 43.

"Recovery Process"

When a selection operation for a recovery process is input to the operation display unit 14, the paper sheet processing device 10 transfers the bills through the former stage route of the recovery process similar to the outward route of the self-examination process indicated by the thick line in FIG. 5A. That is, one storage unit among the eight storage units 43, which is a recovery target, feeds out the bills. The bills fed out from the storage unit to be recovered are transferred to the temporary storage unit 18 by a transfer path corresponding to the storage unit to be recovered among the branch transfer paths 72 to 74, the storage transfer path 51, the upper side sending path portion 55 of the vertical transfer path 46, the rear side constitution unit 49 of the deposit transfer path 21, the internal transfer path 25 of the identification unit 17, and the linear transfer path 26. The transferred bills are temporarily stored in the temporary storage unit 18. In this manner, all the bills in the one storage unit 43 to be collected are transferred to the temporary storage unit 18.

Figure 8:
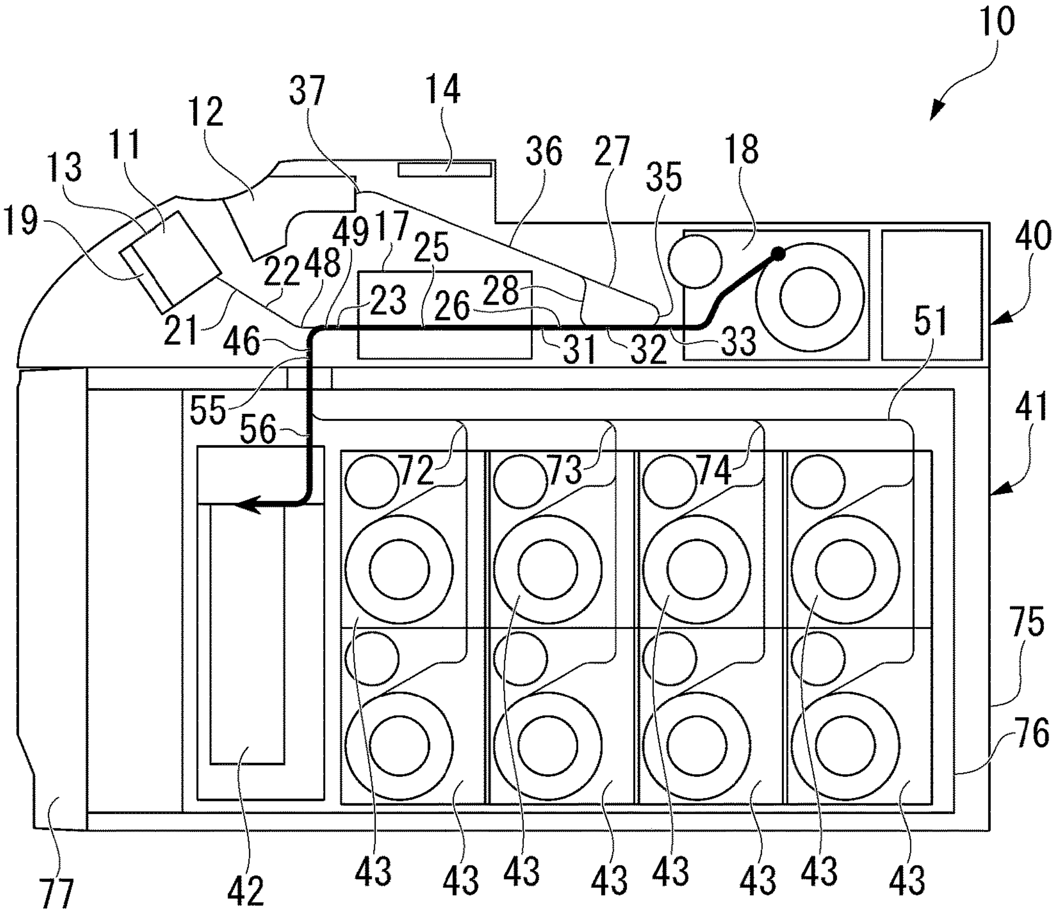
FIG. 8 is a side view schematically showing a later stage route of a recovery process in the paper sheet processing device of an embodiment according to the present invention.

Next, the paper sheet processing device 10 transfers bills through the later stage route of the recovery process indicated by the thick line in FIG. 8. That is, the bills temporarily stored in the temporary storage unit 18 are fed out by the temporary storage unit 18. The fed out bills are transferred to the front cassette 42 by the linear transfer path 26, the internal transfer path 25 of the identification unit 17, the rear side constitution unit 49 of the deposit transfer path 21, and the vertical transfer path 46, and are stored by the front cassette 42.

This type of process is performed on the storage unit 43 to which the recovery process has been designated (may be all). Thereafter, the lid 77 of the paper sheet processing device 10 is opened, and the front cassette 42 is removed from the unit main body 76.

"Identification Adjustment Process"

Since the identification unit 17 identifies the bills while allowing the bills to pass through in both the first and second directions as described above, there is a need to perform the identification adjustment in two directions, that is, the first direction and the opposite second direction.

Figure 9A:
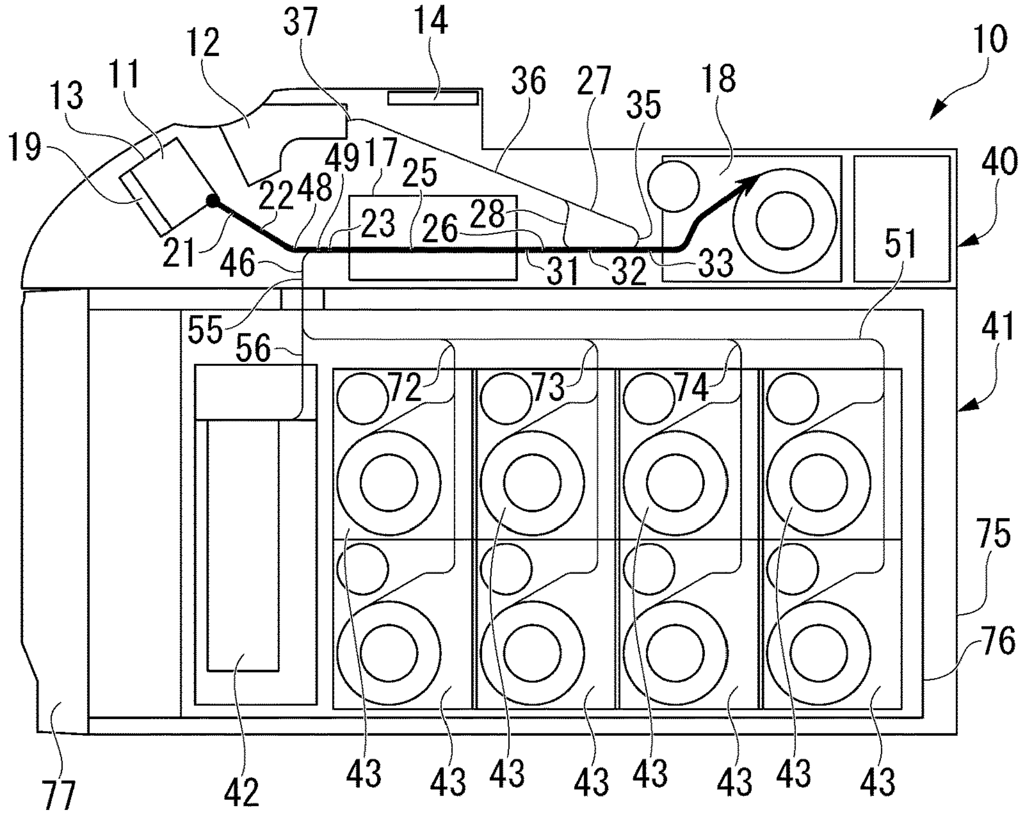
FIG. 9A is a side view schematically showing an outward route of an identification adjustment process in the paper sheet processing device according to an embodiment of the present invention.

When an operation for the identification adjustment process is input to the operation display unit 14, the paper sheet processing device 10 opens the shutter 13. When a plurality of identification adjustment sheets, which are sheets for identification adjustment, are input to the input unit 11 from the outside in this state, a sensor (not shown) detects this. Then, the paper sheet processing device 10 closes the shutter 13 and then transfers the plurality of identification adjustment sheets through the outward route of the identification adjustment process indicated by the thick line in FIG. 9A. That is, first, the input unit 11 feeds out the identification adjustment sheets one by one. The fed out identification adjustment sheets are transferred by the deposit transfer path 21, and the internal transfer path 25 of the identification unit 17. The identification unit 17 identifies the identification adjustment sheets one by one while the identification adjustment sheets are being transferred in the first direction in the internal transfer path 25 at this time. Thereafter, the identified identification adjustment sheets are transferred to the temporary storage unit 18 by the linear transfer path 26 and are temporarily stored in the temporary storage unit 18 (see the thick solid line in FIG. 9A).

Figure 9B:
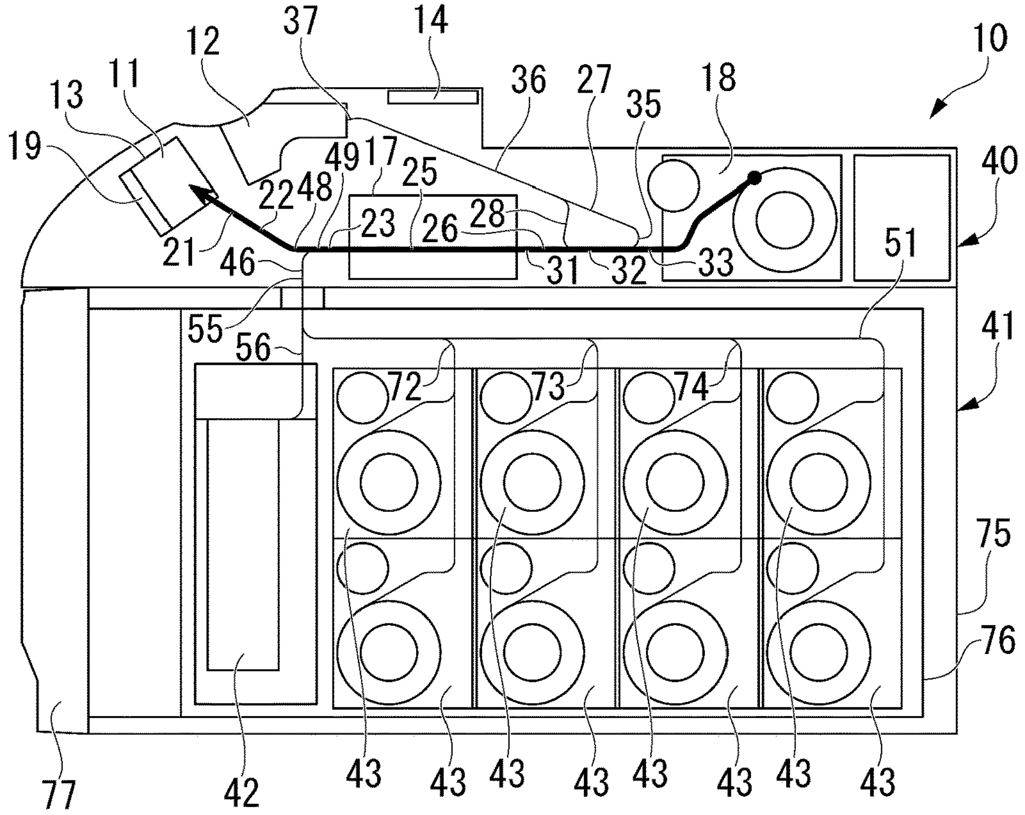
FIG. 9B is a side view schematically showing a return route of the identification adjustment process in the paper sheet processing device of an embodiment according to the present invention.

Next, the paper sheet processing device 10 transfers the identification adjustment sheets through the return route of the identification adjustment process indicated by the thick line in FIG. 9B. That is, first, the plurality of identification adjustment sheets temporarily stored in the temporary storage unit 18 are fed out one by one by the temporary storage unit 18. The fed out identification adjustment sheets are transferred by the linear transfer path 26, and the internal transfer path 25 of the identification unit 17. The identification unit 17 identifies the identification adjustment sheets one by one while the identification adjustment sheets are being transferred in the second direction in the internal transfer path 25 at this time. Thereafter, the identification adjustment sheets are transferred to and accumulated in the input unit 11 in which the shutter 13 is in a closed state, by the deposit transfer path 21. Thereafter, the paper sheet processing device 10 opens the shutter 13 so that these identification adjustment sheets can be taken out from the outside of the device from the input unit 11.

As described above, a predetermined plurality of identification adjustment sheets are passed through the identification unit 17 in the first direction in the internal transfer path 25, and based on the identification result of the identification unit 17, the identification level of the identification unit 17 during this transfer in the first direction is adjusted. Similarly, a predetermined plurality of identification adjustment sheets are passed through the identification unit 17 in the second direction in the internal transfer path 25, and based on the identification result of the identification unit 17, the identification level of the identification unit 17 during this transfer in the second direction is adjusted.

As described above, in the identification adjustment process, the identification adjustment sheets are identified by the identification unit 17 while passing through the identification unit 17 in the first direction, and are identified by the identification unit 17 while passing through in the second direction. At the time of this identification adjustment process, the paper sheet processing device 10 performs identification in the identification unit 17 while allowing the identification adjustment sheets input into and fed out from the input unit 11 to pass through in the first direction in the identification unit 17. Thereafter, the paper sheet processing device 10 transfers the identification adjustment sheets to the temporary storage unit 18, performs identification in the identification unit 17 while feeding out the identification adjustment sheets from the temporary storage unit 18 and allowing them to pass through the identification unit 17 in the second direction, and then returns them to the input unit 11. In the identification unit 17, the identification level of the identification unit 17 is adjusted so that the first and second identification results of the identification unit 17 performed while allowing the identification adjustment sheets to pass through in the first direction and the second direction are desired results.

Here, when the input unit 11 is dedicated to deposit, it is preferable to perform control for normally accumulating the identification adjustment sheets in the input unit 11 described above.

In the paper sheet processing device 10 of the present embodiment described above, bills input from the outside of the device are supplied from the input unit 11 into the device and identified in the identification unit 17 while being allowed to pass through in the first direction, and the bills identified as being acceptable are temporarily stored in the temporary storage unit 18. On the other hand, the bills identified as being unacceptable are transferred to the payout unit 12 and can be taken out of the device. Furthermore, the paper sheet processing device 10 identifies the bills temporarily stored in the temporary storage unit 18 while allowing them to pass through in the second direction in the identification unit 17, and stores the bills identified based on the identification result in the storage unit 43. On the other hand, the paper sheet processing device 10 can also identify the bills temporarily stored in the temporary storage unit 18 while allowing them to pass through in the second direction in the identification unit 17, and then transfer them to the input unit 11.

Therefore, during the adjustment process of the identification level of the identification unit 17 using the identification adjustment sheets, the identification adjustment sheets input into the input unit 11 and fed out from the input unit 11 are identified in the identification unit 17 while being allowed to pass through in the first direction, and then transferred to the temporary storage unit 18, and the identification adjustment sheets are fed out from the temporary storage unit 18 and identified in the identification unit 17 while being allowed to pass through in the second direction, and then returned to the input unit 11. Accordingly, the identification adjustment sheets can be transferred back and forth through the route connecting the input unit 11, the identification unit 17, and the temporary storage unit 18. Therefore, the processing time for the identification adjustment process can be shortened.

In order to understand the embodiment of the present invention described above in more detail, a conventional paper sheet processing device will be described.

When the conventional paper sheet processing device is capable of identification by the identification unit in both the forward and backward transfer directions, for an operation of adjusting this identification level of the identification unit, it is necessary to transfer and identify a predetermined number of specific identification adjustment sheets in two directions of forward and backward directions, respectively. When the identification adjustment sheets are allowed to pass through the identification unit in the forward direction, the identification adjustment sheets are transferred in the order of the input unit, the identification unit, and the temporary storage unit. On the other hand, when the identification adjustment sheets are allowed to pass through the identification unit in the backward direction, the identification adjustment sheets are transferred in the order of the temporary storage unit, the identification unit, and the storage unit. When the identification adjustment sheets are allowed to pass through the identification unit in the first and second directions, the identification level is adjusted so that the identification unit outputs a desired identification result. Thereafter, in the conventional paper sheet processing device, it is necessary to transfer the identification adjustment sheets from the storage unit to the payout unit in order to collect the identification adjustment sheets.

When the conventional paper sheet processing device will be described more specifically using a structure with reference numerals of the paper sheet processing device 10 according to the present embodiment, the identification adjustment sheets input into the input unit 11 and fed out from the input unit 11 are identified in the identification unit 17 while being allowed to pass through the identification unit 17 in the first direction, and then transferred to the temporary storage unit 18. Then, the identification adjustment sheets are identified in the identification unit 17 while feeding them out from the temporary storage unit 18 and allowing them to pass through the identification unit 17 in the second direction, and are then transferred to a predetermined storage unit 43 and transferred to the payout unit 12 from this storage unit 43 in the same manner as in the dispensing process.

As described above, in the conventional paper sheet processing device, the identification adjustment sheets after being allowed to pass through the identification unit in the second direction are first transferred to the storage unit and then transferred from the storage unit to the payout unit. Therefore, it takes more time than when the identification adjustment sheets are transferred in the first direction in the identification unit for identification. Further, when the identification adjustment sheets are transferred in the order of the temporary storage unit, the identification unit, and the storage unit, since the storage unit serving as the transfer destination is used as a circulation box, the storage unit needs to be empty. At this time, when the bills are stored in the storage unit, since there is a need to avoid mixing of the bills with the identification adjustment sheets, it is necessary to collect all the bills before starting an operation for adjusting the identification unit. Therefore, operational procedures associated therewith are further increased, and further labor is required.

On the other hand, the paper sheet processing device 10 of the present embodiment is capable of transferring the identification adjustment sheets from the identification unit 17 to the input unit 11 after the identification adjustment sheets have been transferred in the second direction in the identification unit 17. Accordingly, since the input unit 11 can be used as an ejection destination of the identification adjustment sheets, the transfer distance of the identification adjustment sheets is short, and the processing time for the identification adjustment process can be shortened. In other words, since it is possible to omit the collecting operation from the circulation box, which has been conventionally required for the identification adjustment, and the steps of bill transfer can be reduced, the time for processing operation can be shortened.

Further, the paper sheet processing device 10 according to the present embodiment can shorten the processing time even in the above-mentioned self-examination process. That is, the time for the self-examination process will be considered in which the bills in the storage unit 43 are fed out from the storage unit 43 and temporarily stored in the temporary storage unit 18, and then the bills in the temporary storage unit 18 are fed out from the temporary storage unit 18 and identified while being allowed to pass through the identification unit 17 in the second direction, and are then stored in the storage unit 43. At this time, when the bills are fed out from the temporary storage unit 18 and allowed to pass through the identification unit 17 in the second direction, the paper sheet processing device 10 can transfer abnormal bills that are identified as being abnormal such as abnormally identified bills or abnormally transferred bills in the identification unit 17 to the input unit 11. Then, the bills identified as being abnormal are then fed out again from the input unit 11 and transferred to the temporary storage unit 18, then fed out from the temporary storage unit 18 and re-identified while being allowed to pass through in the opposite direction by the identification unit 17, and can be stored in the storage unit 43 based on the result. Accordingly, the transfer distance for re-identification of a bill once identified as being abnormal by the identification unit 17 is shortened, and it is possible to eliminate the manual input operation into the input unit 11. Therefore, the processing time for the self-examination process can be shortened, and the labor can be suppressed.

When the self-examination process of the conventional paper sheet processing device will be described using a structure with reference numerals of the paper sheet processing device 10 according to the present embodiment, for example, during the self-examination process for the storage unit 43 other than those set as the damaged bill storage unit, the abnormal bills that are fed out from the temporary storage unit 18 and are identified as being abnormal by the identification unit 17 when being allowed to pass through the identification unit 17 in the second direction are stored in the storage unit 43 set as the predetermined damaged bill storage unit. Further, in the case of performing the self-examination process on the storage unit 43 set as the damaged bill storage unit, the bills are transferred from the storage unit 43 set as the damaged bill storage unit to the payout unit 12, and the bills input into the input unit 11 through a manual input operation from the payout unit 12 to the input unit 11 are temporarily stored in the temporary storage unit 18, and then the bills in the temporary storage unit 18 are fed out from the temporary storage unit 18 and identified by the identification unit 17 while being allowed to pass through the identification unit 17 in the second direction, and are then stored in the storage unit 43.

On the other hand, the paper sheet processing device 10 of the present embodiment is configured so that the bills that have passed through the identification unit 17 in the second direction can be transferred from the identification unit 17 to the input unit 11. Therefore, the input unit 11 can be used as a temporary evacuation destination for bills identified as being abnormal. In the paper sheet processing device 10 of the present embodiment, the bills stored in the input unit 11 and identified as being abnormal can be fed out from the input unit 11 and stored in the temporary storage unit 18, and then fed out from the temporary storage unit 18, identified again in the identification unit 17, and stored in the storage unit 43. Accordingly, since the transfer distance of the bills is shortened, and a manual operation for moving the bills is eliminated, it is possible to shorten the processing time for the self-examination process and to suppress the labor for the self-examination process. Further, since it is possible to suppress the occurrence of a user operation of taking bills in and out, the procedure is simplified and it is possible to reduce the possibility of generating errors. In addition, since the possibility of ejecting the money inside the device to the outside of the device can be reduced, the possibility of generating problems in the management of money inside the device can also be reduced. Therefore, it is possible to contribute to the strict management of the amount on hand in the device.

INDUSTRIAL APPLICABILITY

In the above description, the paper sheet processing device 10 that processes bills as paper sheets has been described as an example, but the present invention is also applicable to a device that processes various paper sheets other than bills, such as securities and cash vouchers.

REFERENCE SYMBOLS LIST

10: Paper sheet processing device
11: Input unit
12: Payout unit
17: Identification unit
18: Temporary storage unit
43: Storage unit

The invention claimed is:

1. A paper sheet processing device comprising:

an input unit in which paper sheets are input and the input paper sheets accumulated on a mounting plate provided in the input unit are fed out to the inside;

an identification unit having an internal transfer path for identifying the paper sheets fed out from the input unit while allowing them to pass through the internal transfer path in a first direction, and identifying the paper sheets while allowing them to pass through the internal transfer path in a second direction opposite to the first direction;

a temporary storage unit including a drum and a tape for temporarily storing the paper sheets fed out from the input unit and identified as being acceptable by being allowed to pass through in the first direction in the identification unit and for feeding out the temporarily stored paper sheets;

a payout container for accommodating the paper sheets fed out from the input unit and identified as being unacceptable by the identification unit so as to be able to be taken out to the outside; and a paper sheet storage for storing the paper sheets fed out from the temporary storage unit and identified by the identification unit while allowing them to pass through in the second direction in the identification unit, wherein the paper sheet processing device is configured to:

feed out the paper sheets to be examined from the paper sheet storage and temporarily stores the paper sheets to be examined in the temporary storage unit, and then feed out from the temporary storage unit the paper sheets to be examined which have been stored in the temporary storage unit;

pass through the paper sheets to be examined which have been fed out from the temporary storage unit in the identification unit in the second direction, identify the paper sheets to be examined by the identification unit, transfer the paper sheets to be examined, which have been identified as being abnormal among the paper sheets to be examined, to the input unit, accumulate the paper sheets which have been identified as being abnormal on the mounting plate;

feed out the paper sheets which have been accumulated from the mounting plate to the temporary storage unit, temporary store the paper sheets which have been fed from the mounting plate in the temporary storage unit, and then feed out from the temporary storage unit the paper sheets to be re-examined which have been stored in the temporary storage unit to pass through the paper sheets to be re-examined in the identification unit in the second direction, identify the paper sheets to be re-examined by the identification unit, transfer the paper sheets to be re-examined, which have been identified as being abnormal among the paper sheets to be re-examined, to the input unit, and wherein the input unit is configured to accumulate the paper sheets which have been identified as being abnormal by lowering the mounting plate by a predetermined amount each time one of the paper sheets which have been identified as being abnormal is fed to the input unit.

2. The paper sheet processing device according to claim 1, wherein, during an identification adjustment in which paper sheets for identification adjustment are identified by the identification unit while being allowed to pass through in the first direction in the identification unit, and are also identified by the identification unit while being allowed to pass through in the second direction:

the paper sheets for identification adjustment input into the input unit and fed out from the input unit are configured to be identified by the identification unit while being allowed to pass through in the first direction in the identification unit, and then configured to be transferred to the temporary storage unit; and the paper sheets for identification adjustment are configured to be fed out from the temporary storage unit and configured to be identified by the identification unit while being allowed to pass through in the second direction in the identification unit, and then returned to the input unit.

3. The paper sheet processing device according to claim 1, wherein, during a self-examination in which paper sheets stored in the paper sheet storage are fed out from the paper sheet storage and temporarily stored in the temporary storage unit, and the paper sheets stored in the temporary storage unit are fed out from the temporary storage unit and identified by the identification unit while being allowed to pass through the identification unit in the second direction, and then stored again in the paper sheet storage, the paper sheets fed out from the temporary storage unit and identified as being abnormal by the identification unit while being allowed to pass through the identification unit in the second direction are configured to be transferred to the input unit, then configured to be fed out from the input unit and configured to be returned to the temporary storage unit, and configured to be fed out from the temporary storage unit and configured to be identified by the identification unit while being allowed to pass through in the second direction in the identification unit.

4. The paper sheet processing device according to claim 1, wherein, when the paper sheets fed out from the temporary storage unit and identified by the identification unit while allowing them to pass through in the second direction in the identification unit are configured to be accumulated on the mounting plate by a predetermined number of the paper sheets, the mounting plate is configured to be lifted by a predetermined amount.

5. The paper sheet processing device according to claim 1, wherein the paper sheets fed out from the temporary storage unit and identified by the identification unit while allowing them to pass through in the second direction in the identification unit are configured to be accumulated on the mounting plate by intermittent feeding at a predetermined time interval.

* * * * *